United States Patent
Asghar et al.

(10) Patent No.: US 6,219,642 B1
(45) Date of Patent: Apr. 17, 2001

(54) QUANTIZATION USING FREQUENCY AND MEAN COMPENSATED FREQUENCY INPUT DATA FOR ROBUST SPEECH RECOGNITION

(75) Inventors: Safdar M. Asghar, Austin, TX (US); Lin Cong, Orangevale, CA (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/166,648

(22) Filed: Oct. 5, 1998

(51) Int. Cl.[7] ............................. G10L 15/14; G10L 15/08
(52) U.S. Cl. .......................................... 704/256; 704/243
(58) Field of Search ................................... 704/230, 231, 704/226, 256, 206, 209, 243

(56) References Cited

U.S. PATENT DOCUMENTS

| | | | |
|---|---|---|---|
| 5,031,217 | 7/1991 | Nishimura | 381/43 |
| 5,414,796 | 5/1995 | Jacobs et al. | 395/2.3 |
| 5,583,888 | 12/1996 | Ono | 375/240 |
| 5,598,505 | * 1/1997 | Austin et al. | 704/226 |
| 5,649,056 | * 7/1997 | Nitta | 704/256 |
| 5,970,445 | * 10/1999 | Yamamoto et al. | 704/230 |
| 6,061,652 | * 5/2000 | Tsuboka et al. | 704/245 |
| 6,067,515 | * 5/2000 | Cong et al. | 704/243 |
| 6,070,136 | * 5/2000 | Cong et al. | 704/222 |

OTHER PUBLICATIONS

Xydeas, C.S. and Cong, L. (1995) "Robust Speech Recognition in a Car Environment"; Presented at DSP95 International Conference om DSP, Jun. 26–28, 1995, Limassol, Cyprus, vol. 1, pp. 84–89.*

Xydeas, C.S. and Cong, L., (1996) "Robust Speech Recognition using Fuzzy Mtrix Quantization, Neural Networks, and Hidden Markov Models,"Proc. of EUSIPCO–96, vol. 3, pp. 1587–1590.*

Xydeas, C.S., Cong, L. (1995) Combining Neural Network Classification with Fuzzy Vector Quantization and Hidden Markov Models for Robust Isolated Word Speech Recognition, Proc. 1995.*

(List continued on next page.)

Primary Examiner—Richemond Dorvil
Assistant Examiner—Angela Armstrong
(74) Attorney, Agent, or Firm—Skjerven Morrill MacPherson, LLP

(57) ABSTRACT

A speech recognition system utilizes multiple quantizers to process frequency parameters and mean compensated frequency parameters derived from an input signal. The quantizers may be matrix and vector quantizer pairs, and such quantizer pairs may also function as front ends to a second stage speech classifiers such as hidden Markov models (HMMs) and/or utilizes neural network postprocessing to, for example, improve speech recognition performance. Mean compensating the frequency parameters can remove noise frequency components that remain approximately constant during the duration of the input signal. HMM initial state and state transition probabilities derived from common quantizer types and the same input signal may be consolidated to improve recognition system performance and efficiency. Matrix quantization exploits the "evolution" of the speech short-term spectral envelopes as well as frequency domain information, and vector quantization (VQ) primarily operates on frequency domain information. Time domain information may be substantially limited which may introduce error into the matrix quantization, and the VQ may provide error compensation. The matrix and vector quantizers may split spectral subbands to target selected frequencies for enhanced processing and may use fuzzy associations to develop fuzzy observation sequence data. A mixer may provide a variety of input data to the neural network for classification determination. Fuzzy operators may be utilized to reduce quantization error. Multiple codebooks may also be combined to form single respective codebooks for split matrix and split vector quantization to reduce processing resources demand.

7 Claims, 5 Drawing Sheets

OTHER PUBLICATIONS

IEEE International Symposium on Information Theory, p. 174.*

Cong, Lin; "A Study of Robust IWSR Systems"; PhD Thesis submitted to The University of Manchester School of Engineering, Division of Electrical Engineering; Manchester, United Kingdom; pp. 1–209. May 1996.

Waibel, Alexander; "Neural Network Approaches for Speech Recognition"; Chapter 18 of *Advances in Speech Signal Processing*; edited by Sadaoki Furui and M. Mohan Sondhi; Marcel Dekker, Inc.; New York, New York; 1992; pp. 555–595.

Xydeas, C. S. and Cong, L.;"Combining Neural Network Classification with Fuzzy Vector Quantization and Hidden Markov Models for Robust Isolated Word Speech Recognition"; *Signal Processing VIII Theories and Applications*, vol. III; Proceedings of the IEEE International Symposium on Information Theory, IEEE Press, 1995, p. 174.

Xydeas, C. S. and Cong, L.; "Robust Speech Recognition in A Car Environment"; Presented at DSP95 International Conference on Digital Signal Processing, Jun. 26–28, 1995, Limassol, Cyprus; vol. 1, pp. 84–89.

Cong, Lin, Prof. C.S. Xydeas, and Anthony Ferwood; "A Study of Robust Isolated Word Speech Recognition Based on Fuzzy Methods"; Presented at EUSIPCO–94, VII European Signal Processing Conference, Sep. 13–16, 1994; Scotland, UK.; 4 pages.

Gibson, Jerry D.; "Coding, Transmission, and Storage"; Chapter 14, Speech Signal Processing, of *The Electrical Engineering Handbook*; Editor–in–Chief Richard C. Dorf; ©1993 by CRC Press, Inc.; pp. 279–314.

Gersho, Allen and Shihua Wang; "Vector Quantization Techniques in Speech Coding"; Chapter 2 of *Advances in Speech Signal Processing*; edited by Sadaoki Furui and M. Mohan Sondhi; Marcel Dekker, Inc.; New York, New York; 1992; pp. 49–84.

Kroon, Peter and Bishnu S. Atal; "Predictive Coding of Speech Using Analysis–by–Synthesis Techniques"; Chapter 5 of *Advances in Speech Signal Processing*; edited by Sadaoki Furui and M. Mohan Sondhi; Marcel Dekker, Inc.; New York, New York; 1992; pp. 141–164.

Honda, Masaaki and Yoshinao Shiraki; "Very Low–Bit–Rate Speech Coding"; Chapter 7 of *Advances in Speech Signal Processing*; edited by Sadaoki Furui and M. Mohan Sondhi; Marcel Dekker, Inc.; New York, New York; 1992; pp. 209–230.

Schroeter, Juergen and M. Mohan Sondhi; "Speech Coding Based on Physiological Models of Speech Production"; Chapter 8 of *Advances in Speech Signal Processing*; edited by Sadaoki Furui and M. Mohan Sondhi; Marcel Dekker, Inc.; New York, New York; 1992; pp. 231–268.

* cited by examiner

QUANTIZATION USING FREQUENCY AND MEAN COMPENSATED FREQUENCY INPUT DATA FOR ROBUST SPEECH RECOGNITION

BACKGROUND OF THE INVENTION

1. Field of the Invention

This invention relates to speech recognition and more particularly relates to determining and providing frequency and mean compensated frequency input data to respective quantizer(s) and backend processors to provide efficient and robust speech recognition.

2. Description of the Related Art

Speech is perhaps the most important communication method available to mankind. It is also a natural method for man-machine communication. Man-machine communication by voice offers a whole new range of information/communication services which can extend man's capabilities, serve his social needs, and increase his productivity. Speech recognition is a key element in establishing man-machine communication by voice, and, as such, speech recognition is an important technology with tremendous potential for widespread use in the future.

Voice communication between man and machine benefits from an efficient speech recognition interface. Speech recognition interfaces are commonly implemented as Speaker-Dependent (SD)/Speaker-Independent (SI) Isolated Word Speech Recognition (IWSR)/continuous speech recognition (CSR) systems. The SD/SI IWSR/CSR system provides, for example, a beneficial voice command interface for hands free telephone dialing and interaction with voice store and forwarding systems. Such technology is particularly useful in an automotive environment for safety purposes.

However, to be useful, speech recognition must generally be very accurate in correctly recognizing (classifying) an input signal with a satisfactory probability of accuracy. Difficulty in correct recognition arises particularly when operating in an acoustically noisy environment. Recognition accuracy may be severely, unfavorably impacted under realistic environmental conditions where speech is corrupted by various levels of acoustic noise.

FIG. 1 generally characterizes a speech recognition process by the speech recognition system 100. A microphone transducer 102 picks up an input signal 101 and provides to signal preprocessor 104 an electronic signal representation of input signal 101. The input signal 101 is an acoustic waveform of a spoken input, typically a word, or a connecting string of words. The signal preprocessor 104 may, for example, filter the input signal 101, and a feature extractor 106 extracts selected information from the input signal 101 to characterize the signal using, for example, cepstral frequencies or line spectral pair frequencies (LSPs).

Referring to FIG. 2, feature extraction in operation 106 is basically a data-reduction technique whereby a large number of data points (in this case samples of the input signal 101 recorded at an appropriate sampling rate) are transformed into a smaller set of features which are "equivalent", in the sense that they faithfully describe the salient properties of the input signal 101. Feature extraction is generally based on a speech production model which typically assumes that the vocal tract of a speaker can be represented as the concatenation of lossless acoustic tubes (not shown) which, when excited by excitation signals, produce a speech signal. Samples of the speech waveform are assumed to be the output of a time-varying filter that approximates the transmission properties of the vocal tract. It is reasonable to assume that the filter has fixed characteristics over a time interval on the order of 10 to 30 milliseconds. The, short-time samples of input signal 101 may be represented by a linear, time-invariant all pole filter designed to model the spectral envelope of the input signal 101 in each time frame. The filter may be characterized within a given interval by an impulse response and a set of coefficients.

Feature extraction in operation 106 using linear predictive (LP) speech production models has become the predominant technique for estimating basic speech parameters such as pitch, formants, spectra, and vocal tract area functions. The LP model allows for linear predictive analysis which basically approximates input signal 101 as a linear combination of past speech samples. By minimizing the sum of the squared differences (over a finite interval) between actual speech samples and the linearly predicted ones, a unique set of prediction filter coefficients can be determined. The predictor coefficients are weighting coefficients used in the linear combination of past speech samples. The LP coefficients are generally updated very slowly with time, for example, every 10–30 milliseconds, to represent the changing states of the vocal tract. LP prediction coefficients are calculated using a variety of well-known procedures, such as autocorrelation and covariance procedures, to minimize the difference between the actual input signal 101 and a predicted input signal 101. The LP prediction coefficients are often stored as a spectral envelope reference pattern and can be easily transformed into several different representations including cepstral coefficients and line spectrum pair (LSP) frequencies. Details of LSP theory can be found in N. Sugamura, "Speech Analysis and Synthesis Methods Developed at ECL in NTT-from LPC to LSP", Speech Communication 5, Elsevier Science Publishers, B. V., pp. 199–215 (1986).

Final decision-logic classifier 108 utilizes the extracted feature information to classify the represented input signal 101 to a database of representative input signal 101. Speech recognition classifying problems can be treated as a classical pattern recognition problem. Fundamental ideas from signal processing, information theory, and computer science can be utilized to facilitate isolated word recognition and simple connected-word sequences recognition.

FIG. 2 illustrates a more specific speech recognition system 200 based on pattern recognition as used in many IWSR type systems. The extracted features representing input signal 101 are segmented into short-term input signal 101 frames and considered to be stationary within each frame for 10 to 30 msec duration. The extracted features may be represented by a D-dimensional vector and compared with predetermined, stored reference patterns 208 by the pattern similarity operation 210. Similarity between the input signal 101 pattern and the stored reference patterns 208 is determined in pattern similarity operation 210 using well-known vector quantization processes. The vector quantization process yields spectral distortion or distance measures to quantify the score of fitness or closeness between the representation of input signal 101 and each of the stored reference patterns 208.

The decision rule operation 212 receives the distance measures and determines which of the reference patterns 208 the input signal 101 most closely represents. In a "hard" decision making process, input signal 101 is matched to one of the reference patterns 208. This one-to-one "hard decision" ignores the relationship of the input signal 101 to all the other reference patterns 208. Fuzzy methods have been introduced to provide a better match between vector quantized frames of input signal 101 and reference patterns 208. In a "soft" or "fuzzy" decision making process, input signal 101 is related to one or more reference patterns 208 by weighting coefficients.

Matrix quantization has also been used to introduce temporal information about input signal 101 into decision rule operation 212. Fuzzy analysis methods have also been incorporated into matrix quantization processes, as described in Xydeas and Cong, "Robust Speech Recognition In a Car Environment", Proceeding of the DSP95 International Conference on Digital Signal Processing, Jun. 26–28, 1995, Limassol, Cyprus. Fuzzy matrix quantization allows for "soft" decisions using interframe information related to the "evolution" of the short-term spectral envelopes of input signal 101.

Input signal corruption by acoustical noise has long been responsible for difficulties in input signal recognition accuracy. However, in many environments, such as in a traveling automobile environment, such noise is generally always present and presents an impediment to conventional speech recognition techniques. Despite conventional speech recognition achievements, research and development continues to focus on more efficient speech recognition systems with higher speech recognition accuracy.

SUMMARY OF THE INVENTION

In some acoustically noisy environments, the acoustical noise remains generally constant in the frequency domain especially over relatively short periods of time such as the time duration of a single spoken word. Such noise characterization is particularly true in, for example, an automobile environment.

Speech recognition processing characterizes a speech input signal with various frequency parameters such as LSPs. In an acoustically noisy environment, the LSPs will also generally be corrupted by noise. However, when noise frequency spectra is generally constant, input signal frequency parameter noise corruption may be minimized by comparing each $i^{th}$ frequency parameter, as derived from one of TO sampled frames of a speech input signal, to a corresponding $i^{th}$ mean frequency parameter derived from all the $i^{th}$ frequency parameters from all TO frames.

For example, in a vehicular environment, such as an automobile or airplane, noise is generally constant in the frequency domain during the duration of a spoken word input signal. Thus, when each sampled frame of the input signal is characterized by D order frequency parameters, the mean frequency parameter for the $i^{th}$ order over TO frames is $\bar{s}_i$ where:

$$\bar{s}_i = \frac{1}{TO}\sum_{j=1}^{TO} s_i(j)$$

where j=1, 2, . . . , TO and i=1, 2, . . . , D. A mean compensated $i^{th}$ frequency parameter from the $j^{th}$ frame, $s_c(m)(j)$, equals $s_i(j)$ minus $\bar{s}_i$, where $s_i(j)$ is the $i^{th}$ frequency parameter for the $j^{th}$ frame. Thus, to the extent that the noise frequency contribution affecting the $i^{th}$ frequency parameter remains generally constant over TO frames, the mean compensated frequency parameters for each frame of the input signal are generally noise free.

Mean compensated frequency parameters such as LSP coefficients may be used as input data to an input signal classifier. For example, in one embodiment, a matrix quantizer and a vector quantizer receive mean compensated LSP coefficients during training and recognition. Furthermore, in another embodiment multiple matrix and vector quantizers may be used with one matrix and vector quantizer pair receiving mean compensated LSP coefficients and a second pair receiving LSP coefficients to, for example, apply the same or dissimilar processing techniques to enhance recognition accuracy. Furthermore, back end classifiers such as hidden Markov models and/or neural networks may also be employed to enhance recognition accuracy.

In one embodiment, when employing multiple matrix and vector quantizer sets with respective hidden Markov model back end classifier groups and providing mean compensated LSP coefficients to one group of matrix and vector quantizers and non-mean compensated LSP coefficients to another such group, the close similarity between initial state probabilities and state transition probabilities for HMMs receiving data from a common quantizer type may be capitalized upon. For example, during training or estimation of hidden Markov models for the $n^{th}$ vocabulary word, for each quantizer, only the probability distribution need be determined and stored in a memory of a computer system independently for each type of quantizer e.g. matrix quantizer types and vector quantizer types. Alternatively, separate hidden Markov models may be independently developed for each quantizer. During recognition, a maximum likelihood algorithm, such as the Viterbi algorithm, may be used to determine the respective probabilities that each hidden Markov model generated a particular quantizer provided observation sequence may be modified to also capitalize on the close similarities of initial state probabilities and state transition probabilities for each type of quantizer.

In one embodiment, matrix quantizers are used in conjunction with vector quantizers to improve recognition accuracy. Vector quantization operates on a single frame of input signal frequency parameters and, at least generally, does not incorporate temporal signal information into the vector quantization operation. However, vector quantization performs particularly well when temporal information is scarce or non-existent, such as with short input signal duration. Matrix quantization operates on multiple input signal frames and, thus, utilizes both temporal and frequency information about the input signal. However, errors may be introduced into matrix quantization operations when operating on a short duration input signal. Thus, although matrix quantization generally leads to a higher recognition accuracy than vector quantization, vector quantization can compensate for matrix quantization errors that may occur when operating on brief duration input signals.

Additionally, signal features may be divided or split by, for example, frequency subbands to allow for differential processing to, for example, target enhanced processing on subbands more affected by noise. Such split matrix and split vector quantization techniques may be used to more efficiently and more accurately classify the input signal. Furthermore, additional speech classifiers such as hidden Markov models may be trained, and their stochastic output data may serve as input data to a further speech classifier such as a neural network. Respective hidden Markov models may be designed using quantization data as the observation sequences and a probability algorithm may be such as the Viterbi algorithm to determine likelihood probabilities.

In one embodiment, a new hybrid speech recognition system utilizes frequency parameters and mean compensated frequency parameters in combination with matrix quantization (MQ) and vector quantization (VQ) with Hidden Markov Models (HMMs) to efficiently utilize processing resources and improve speech recognition performance. In another embodiment, a neural network is provided with data generated from the hidden Markov models to further enhance recognition accuracy. This MQ/HMM__VQ/HMMx2__NN system exploits the "evolution" of speech short-term spectral envelopes with error compensation from VQ/HMM processes. Additionally, the neural network, which in one embodiment is a multi-layer perception type neural network, further enhances recognition accuracy. Acoustic noise may affect particular frequency domain subbands. In one embodiment, split matrix and split vector quantizers exploit localized noise by efficiently allocating enhanced processing technology to target noise-affected input signal parameters and minimize noise influence. The enhanced processing technology employs, for example, a weighted LSP and signal energy related distance measure in a LBG algorithm. In another embodiment, matrix and vector quantizers are utilized to process incoming speech data without splitting frequency subbands. In another embodiment, a variety of input data may be provided to the neural network to efficiently maximize recognition accuracy. In a further embodiment, 'hard' decisions, i.e., non-fuzzy decisions, are utilized by the respective quantizers to reduce processing resource demand while continuing to use other enhanced recognition resources to achieve high percentage speech recognition accuracy.

In one embodiment, multiple speech processing subsystems receiving frequency parameters and mean compensated frequency parameters are employed to provide initial quantization data to respective speech classifiers. Output data from the speech classifiers may be combined in such a way to compensate for quantization errors introduced by the speech processing subsystems. In another embodiment, one of the speech processing subsystems includes a vector quantizer which provides quantization information to a speech classifier having hidden Markov models. Another speech processing subsystem includes a matrix quantizer which provides quantization information to another speech classifier having hidden Markov models. Output data from the respective hidden Markov models respectively associated with the vector and matrix quantizers may be mixed using any of a variety of criteria and provided to, for example, a neural network for enhanced recognition accuracy speech classifiers.

In one embodiment of the present invention, a signal recognition system includes a frequency parameter mean compensation module to receive frequency parameters of an input signal and to generate mean compensated frequency parameters from the received input signal frequency parameters, a first quantizer to receive the input signal frequency parameters and to quantize the input signal frequency parameters, and a second quantizer to receive the input signal mean compensated frequency parameters and to quantize the input signal mean compensated frequency parameters. The signal recognition system further includes a backend processor to receive the quantized input signal frequency parameters and the input signal mean compensated input signal frequency parameters and to generate an input signal classification therefrom.

In another embodiment of the present invention, a method includes the steps of sampling an input signal, characterizing the sampled input signal with frequency parameters, generating mean compensated frequency parameters from the frequency parameters, and providing the frequency parameters to a first quantizer. The method further includes the steps of providing the mean compensated frequency parameters to a second quantizer, and quantizing the frequency parameters with the first quantizer to generate first quantization data, quantizing the mean compensated frequency parameters with the second quantizer to generate second quantization data, and providing the first and second quantization data to a backend processor to classify the input signal.

BRIEF DESCRIPTION OF THE DRAWINGS

Features appearing in multiple figures with the same reference numeral are the same unless otherwise indicated.

DETAILED DESCRIPTION OF THE PREFERRED EMBODIMENTS

The following description of the invention is intended to be illustrative only and not limiting.

The following definitions are used herein unless otherwise indicated:

Word—any spoken utterance including words and numbers;

Speech—any word and background acoustic noise;

The following abbreviations are used herein unless otherwise indicated:

FMQ—fuzzy matrix quantization

FVQ—fuzzy vector quantization

Figure 1:
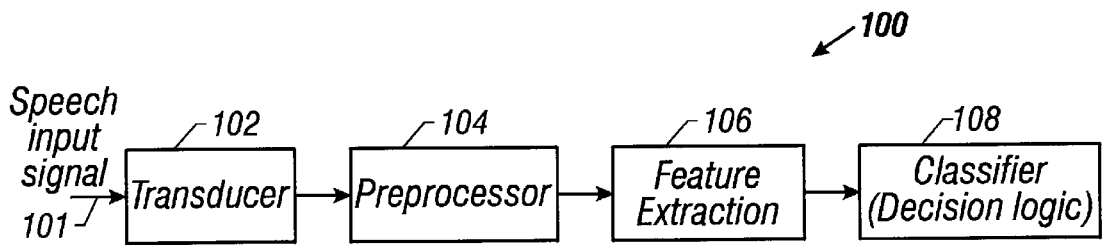
FIG. 1, labeled prior art, illustrates a general speech recognition system.
Figure 2:
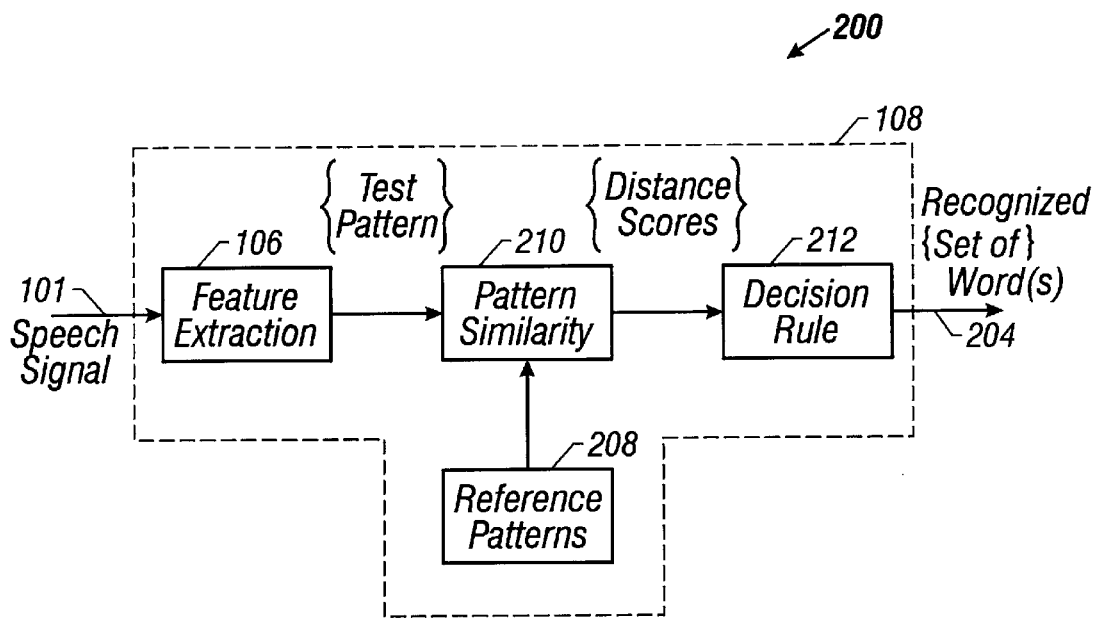
FIG. 2 illustrates a pattern-recognition based speech recognition system.
Figure 3:
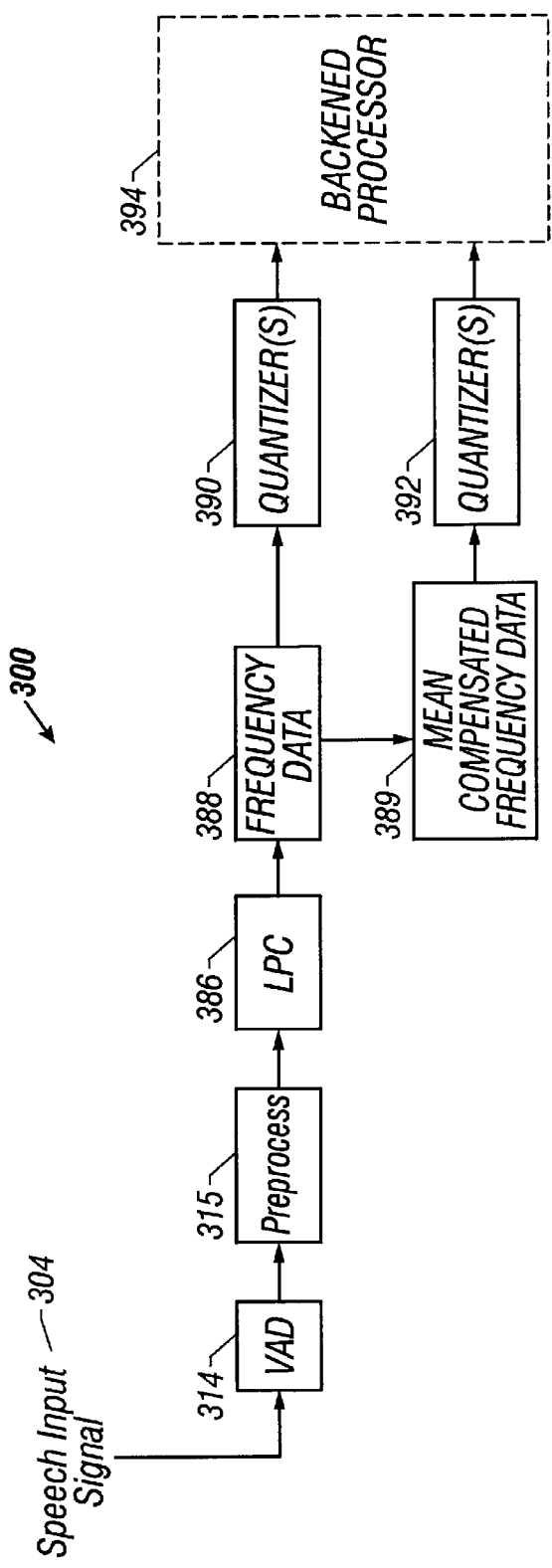
FIG. 3 illustrates a speech recognition system utilizing both frequency data and mean compensated frequency data.

FSMQ—fuzzy split matrix quantizer;

FSVQ—fuzzy split vector quantizer;

SMQ—split matrix quantization;

SVQ—split vector quantization;

MQ—matrix quantization;

VQ—vector quantization;

HMM—hidden Markov model;

$\lambda$—a HMM process;

$\Pr(O/\lambda)$—probability of HMM process $\lambda$ producing observation sequence O;

MLP NN—multilevel perception neural network;

NN—neural network;

LSP—line spectral pair;

dB—decibel;

SD/SI—speaker dependent/speaker independent;

SNR—signal to noise ratio;

Referring to an embodiment of a speech recognition system, speech recognition system 300, in FIG. 3, speech input signal 304 often includes noise components especially when sampled from an acoustically noisy environment such as a vehicular environment. The speech input signal 304 is received and sampled by a well-known voice activity detector 314, preprocessed in preprocess operation 315, described below, and characterized. Characterizing the sampled speech input signal 304 into LPC coefficients in LPC operation 386 represents one method of characterizing speech input signal 304, as described below with reference to LPC and energy parameters operation 316. The LPC coefficients may be converted into frequency domain data in frequency data operation 388 and represented by D order coefficients, such as D order LSP coefficients. The $i^{th}$ coefficient for the $j^{th}$ sampled frame of each speech input signal 304 may be represented by $s_j(i)$, i=1, 2, ..., D and j=1, 2, ..., TO.

In many acoustical environments, the average noise corruption of speech input signal 304 in the frequency domain is generally approximately constant over an interval of time corresponding to the relatively short duration of, for example, a spoken word. Thus, the average noise corruption of all TO sampled frames for a short duration speech input signal 304 is approximately equal to the noise corruption in the $j^{th}$ frame. Thus, mean compensated frequency data, $s_j(i)_{(m)}$, i=1, 2, ..., D and j=1, 2, ..., TO, may be generated in mean compensated frequency data operation 389 to remove a substantial portion of the noise corruption from such speech input signal 304. In one embodiment, the frequency data generated in frequency data operation 388 is provided to the mean compensated frequency data operation 389 which determines $s_j(i)_{(m)}$ for all D coefficients and all TO frames of speech input signal 304 as follows:

$$s_j(i)_{(m)} = s_j(i) - \frac{1}{TO}\sum_{j=1}^{TO} s_j(i), i = 1, 2, \ldots, D \text{ and}$$

$$j = 1, 2, \ldots, TO, [0]$$

where the subtrahend is the mean value of the $i^{th}$ coefficient over all TO frames of speech input signal 304.

The frequency data generated in frequency data operation 388 is provided to quantizer(s) 390 which quantizes the data using, for example, vector type quantization, matrix type quantization, or both vector and matrix quantization. Other speech input signal 304 signal characteristics, such as energy data and data derived from energy data, may also be provided to quantizer(s) 390. The mean compensated frequency data generated in mean compensated frequency data operation 389 is provided to quantizer(s) 392 which quantizes the data using, for example, vector quantization, matrix quantization, or both vector and matrix quantization. Quantizer(s) 390 and 392 may support different processing algorithms and techniques to efficiently enhance recognition accuracy with several embodiments described in more detail below.

The output data from quantizer(s) 390 and 392 may be used directly to determine to classify speech input signal 304 with preference given to either one of the quantizer(s) 390 and 392, or the output data from quantizer(s) 390 and 392 may be provided to a backend processor 394. Backend processor 394 may include speech classifiers such as (i) hidden Markov models and a maximum likelihood algorithm such as the Viterbi algorithm, (ii) a neural network such as multi-level perceptron neural network, (iii) hidden Markov models and a maximum likelihood algorithm which provide input data to a neural network, and (iv) a mixer which provides a selective combination of input data such as maximum likelihood output data from hidden Markov models and quantizer(s) 390 and 392 output data to a neural network. When using multiple matrix and vector quantizer pairs, the Viterbi algorithm may be modified as described below to capitalize on similarities between the initial state and state transition probabilities of hidden Markov models corresponding to respective quantizer types. The backend processor 394 also may include decision logic to classify the speech input signal 304 as a speech recognition system 300 vocabulary word with the highest probability of corresponding to speech input signal 304 as determined by quantizer(s) 390 and 392 and any other backend processor 394 speech classifier modules.

Referring to an embodiment of a speech recognition system 300 in FIG. 4, speech recognition system 400, frequency data in the form of LSP coefficients plus energy data derived from speech input signal 304, described below, are provided to a pair of matrix and vector quantizers. The LSP coefficients for each frame of speech input signal 304 are mean compensated in accordance with Equation [0] and provided to a second pair of matrix and vector quantizers. The dual pairs of matrix and vector quantizers 402 and 404 in one embodiment are trained with and process respective input data identically.

The speech recognition system 400 recognizes a speech input signal 304 using the combined classification power of both time and frequency domain information derived from matrix quantization with error compensation from frequency domain information derived from vector quantization. Fuzzy processes may be implemented to further enhance recognition accuracy as illustratively discussed in chapter 3 of the Doctor of Philosophy thesis of Lin Cong entitled "A Study of Robust IWSR Systems" (L. Cong thesis) and located in the John Rylands University Library of Manchester in Manchester, England, which thesis is hereby incorporated by reference in its entirety. Vector quantization operates on a single frame of input signal frequency parameters and, at least generally, does not incorporate temporal signal information into the vector quantization processing operation. However, vector quantization performs particularly well when temporal information is scarce or non-existent, such as with short input signal duration. Matrix quantization operates on multiple input signal frames representing the time "evolution" of an input signal and, thus, utilizes both time domain and frequency domain information about the input signal. However, errors may be introduced into matrix quantization processing operations when operating on a short duration input signal. Thus, although matrix quantization generally leads to a higher recognition accuracy than vector quantization, vector quantization information may be utilized to compensate for matrix quantization errors that may occur when operating on input signals having limited useful temporal information.

"Vector quantization (VQ)" and "matrix quantization (MQ)" nomenclature herein represent the respective general quantization processes which include fuzzy and hard decision vector and matrix quantization, respectively, and split vector and split matrix quantization, respectively. Splitting matrix and vector quantization processes into a respective number of $S_M$ matrix quantization groups and $S_V$ vector quantization groups are greater than or equal to one allows targeting of specific spectral frequency region(s) for enhanced processing while more general processing may be applied to other spectral frequency region(s) where the cost of enhanced processing outweighs the benefits. "S" is used herein to represent both $S_M$ and $S_V$ unless otherwise indicated, and, for S>1, S groups of parameters may be separated for fuzzy or hard split vector quantization, and, for S>1, S groups of parameters may be separated for fuzzy or hard split matrix quantization. Note that $S_M$ may be equal to, less than, or greater than $S_V$ to selectively split quantization input data for quantization processing. The split groups may be separated on the basis of, for example, isolating groups primarily affected by localized noise. For example, we have observed that in some acoustic environments, noise frequencies are primarily located in lower frequency spectral regions. Thus, speech input signal 304 spectral parameters may be split, for example, into a first group which is primarily affected by the acoustic noise and into a second group that is primarily unaffected by the acoustic noise. An enhanced distance measure may be employed in the quantization of the first group to counteract the acoustic noise corruption of the input signal 304 parameters, and a simpler distance measure may be employed in conjunction with quantization of the second group. Thus, processing resources may be efficiently allocated more heavily to processing the first group of parameters while using less but sufficient processing resources to process the second group of parameters.

In addition to matrix and vector quantization, the speech recognition system 400 may further utilize probabilistic classification processes to further enhance speech recognition accuracy. Matrix and vector quantizers serve as front end speech classifiers to provide observation sequences, in the forms of respective classification vectors, to respective HMMs in order to characterize the HMMs during training. Each of the HMMs are preferably trained for a single word and may be gender specific. During speech recognition processes, the respective HMMs and a Viterbi algorithm provide maximum likelihood probabilistic output data which relate the speech input signal 304 to a specific HMM which is most likely to have generated the observation sequence. The decision logic 328 receives such probabilistic output data and determines the vocabluary word that is most likely to match the input signal 384.

Figure 5:
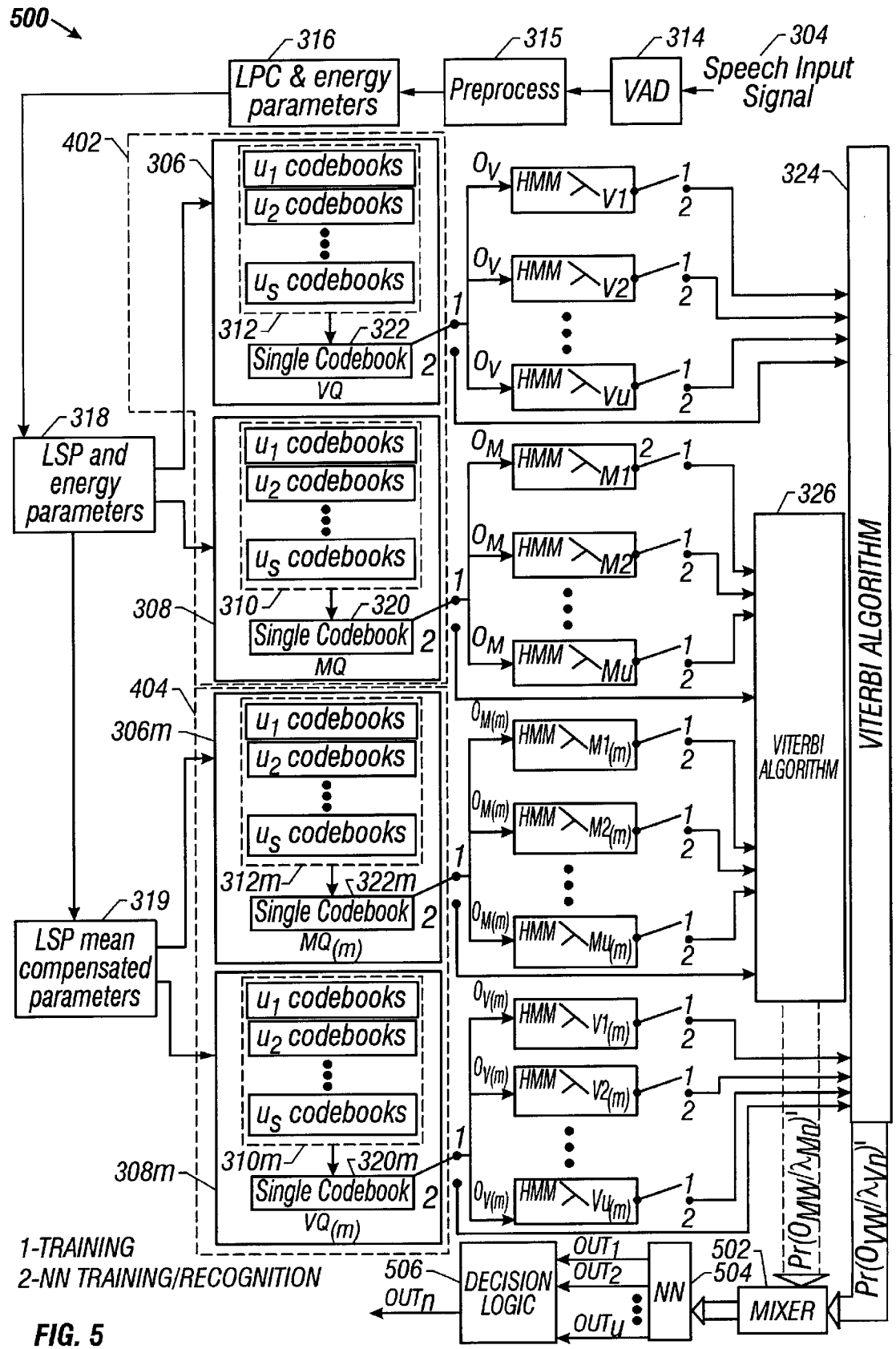
FIG. 5 illustrates an embodiment of the speech recognition system of FIG. 4 with a neural network post-processor.

Referring to FIG. 5, the speech recognition system 500 replaces decision logic 328 of speech recognition system 400 with a mixer 502, neural network 504, and decision logic 506 and is otherwise identical to speech recognition system 400. A mixer 502 combines the Viterbi algorithm processed HMM output data corresponding to vector quantization and Viterbi algorithm processed HMM output data corresponding to matrix quantization. The mixer 502 may, for example, weight the vector and/or matrix related HMM output data to, for example, compensate for any matrix quantization error and, thus, enhance recognition accuracy. Additionally, a neural network 504, such as an MLP neural network, enhances recognition accuracy by processing input data generated by the mixer 502 by determining the probabilities of each vocabulary word matching input signal 304. Decision logic 506 then determines the vocabulary word that is most likely to match the input signal 304. The speech recognition systems 300, 400, and 500 may all be utilized in conjunction with SD/SI speech recognition.

Figure 4:
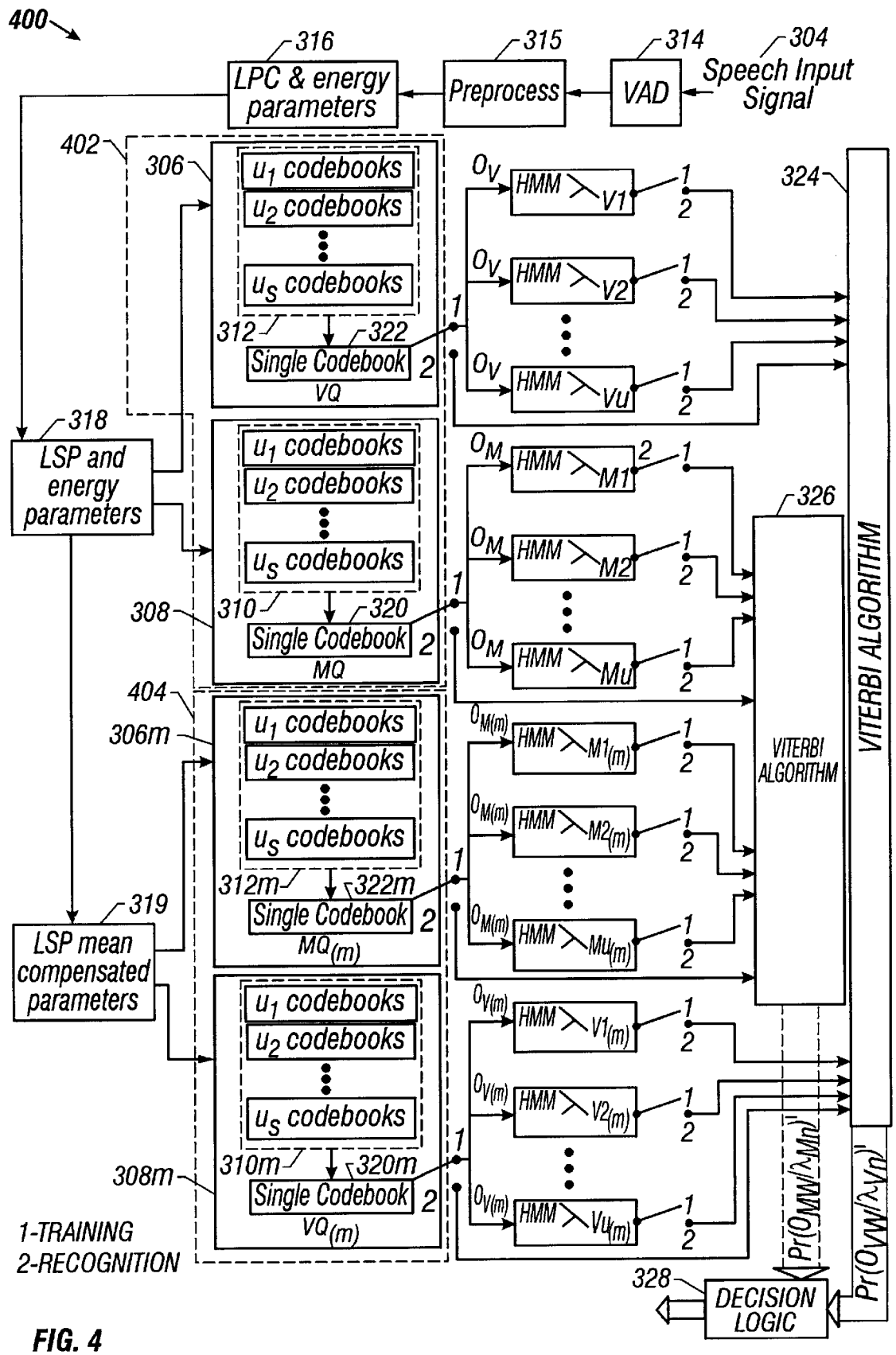
FIG. 4 illustrates an embodiment of the speech recognition system of FIG. 3 utilizing LSP and LSP mean compensated input data for respective multiple pairs of vector and matrix quantizers which serve as front ends to respective hidden Markov model speech classifiers.

Referring to FIGS. 4 and 5, unless otherwise indicated, matrix quantizers 308 and 308m are designed and function identically but use frequency data and mean compensated frequency data, respectively. The respective codebook data will of course reflect the respective input data. Thus, a reference to matrix quantizer 308 also refers to matrix quantizer 308m, unless otherwise indicated. The same is true for vector quantizers 306 and 306m. Additionally, single or multiple codebooks may be employed by matrix and vector quantizers 306 and 308 to efficiently process speech input signal 304 parameters for speech recognition. Quantization with a single codebook is illustratively described in U.S. patent application Ser. No. 08/883,979 by Safdar M. Asghar and Lin Cong and entitled "Speech Recognition System Using A Single Robust Codebook", which is hereby incorporated by reference in its entirety. Quantization with multiple codebooks is illustratively described in U.S. patent application Ser. No. 08/883,978 by Lin Cong and Safdar M. Asghar and entitled "Adaptive Speech Recognition With Selective Input Data To A Speech Classifier," which is hereby incorporated by reference in its entirety.

Referring to FIG. 4, in preparation for speech recognition with the flow path set to position 1, training, speech recognition system 400 undergoes a training process to design respective codebooks for the VQ 306 and MQ 308. A data base of u words repeated r times and corrupted by q different levels of acoustic noise is used during the training process, where u corresponds to the vocabulary size of speech recognition system 400, and q and r are positive integers, for example, seven and two, respectively.

Initially during training of VQ 306 and MQ 308, a single codebook is designed for each of the u words in each of the S matrices for each of VQ 306 and MQ 308. Thus, uS matrix codebooks 310 and uS vector codebooks 312 are respectively designed with the $n^{th}$ word, n=1, 2, . . . u, being repeated r times at q SNR levels. Speech recognition system 400 is designed for robustness by training with multiple acoustic noise SNR corruption levels to better model realistic speech input signal 304 input conditions where speech is corrupted by acoustic noise. In the embodiment of FIG. 3, the respective SNR levels used to train speech recognition system 400 are, for example, clean speech ($\infty$), 35 dB, 25 dB, 20 dB, 15 dB, 10 dB, and 5 dB to model various noises in an automotive environment. Other SNR values may be chosen to model other acoustic environments or more extensively model the automotive environment. Thus, a total training database of r times q (rq) entries is used to design each of the uS matrix codebooks 310 and uS vector codebooks 312. Each of the uqr entries in the total training database is respectively provided as speech input signal 304 to speech recognition system 400 and preprocessed by preprocess operation 315 which, for example, band limits speech input signal 304 to 3.6 kHz and samples speech input signal 304 at 8 ksamples/sec with a resolution of 16 bits per sample. During speech recognition, when continuous speech is produced, voice activity detector (VAD) 314 effectively defines end points of speech input signal 304 words for SD/SI independent word speech recognition.

Figure 6:
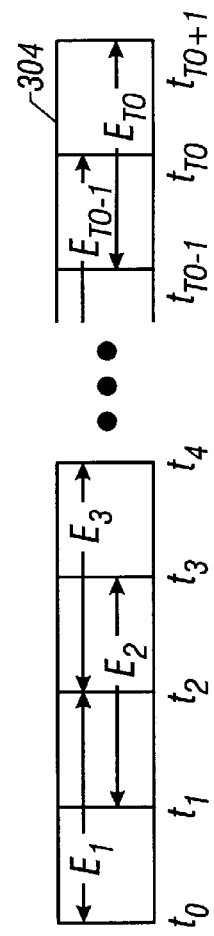
FIG. 6 illustrates a sequence of frames defining a speech input signal.

Referring to FIGS. 4 and 6, a D order linear predictive code (LPC) analysis is performed in LPC and energy parameters operation 316 on each of the TO frames of speech input signal 304 to compute the LPC coefficients for the acoustic signal 304 frame using, for example, the Burg algorithm. A 10 msec overlap is provided between frames, and each of the TO frames is defined by a time window of $t_a$ to $t_{a+2}$, a=0 through TO−1, with an overlap by an adjacent frame of $t_{a+1}$ to $t_{a+2}$. D may vary depending on tradeoffs between desired resolution and processing speed and in this embodiment, D is generally in the range of ten to sixteen, and is, for example, twelve. Frame times for each of the TO frames may vary and are, in general, chosen to represent an approximately static vocal tract period in a range of, for example, 10–30 msec, and are, for example, 20 msec.

Energy parameters $E_y$, y=TO, may be generated in LPC and energy parameters operation 316 for each frame of each speech input signal 304. Spectral frequency parameters alone may be used to characterize a speech input signal 304 and codewords in respective codebooks. Additionally, both energy and spectral frequency parameters may be used to characterize speech input signal 304 and the codewords and to generate a quantization distance measure. During predetermined time intervals, words typically have unique energy "signatures", and, thus, utilizing input signal energy parameters can be used to increase classification accuracy. The energy, $E_y$, in each frame of the speech input signal 304 may be used during training to develop codeword parameters in VQ 306 and MQ 308, and be used during recognition to compare speech input signal 304 energy parameters to corresponding codeword parameters derived from energy parameters of training database entries. The utilization of input signal energies for classification purposes is further illustratively described in the U.S. patent application Ser. No. 08/907,145 by Safdar M. Asghar and Lin Cong entitled "Robust Speech Parameters In A Robust Speech Recognition System", which is hereby incorporated by reference in its entirety.

When the speech input signal 304 is corrupted by an acoustic noise signal, a distance measure using determined energy and frequency parameters enhances the distinction between respective input signals by at least partially suppressing the noise signal component of the speech input signal 304. For example, during an interval of time, acoustic noise signal energy is relatively constant in the time domain while the speech word signal energy typically varies more substantially during the same interval of time. By determining the first derivative or change of the input signal energy over different intervals of time, corruption by a noise signal with relatively constant energy may be significantly eliminated to enhance the distinction between respective input signal words. Furthermore, the energy of the second derivative or change of the input signal first energy derivative during the same intervals of time may be used to further enhance the distinction between respective input signal words. Furthermore, as described in more detail below, error factors may be derived and employed in the distance measure to further address acoustic noise corruption of the speech input signal 304 parameters.

To utilize speech input signal 304 energy distinctions and typical noise energy characteristics, each frame of speech input signal 304 is processed in LPC and energy parameters operation 316 to also determine the respective energy, $E_y$, in the yth frame, y=1, 2, . . . , TO, during the 20 msec time interval of $t_a$ to $t_{a+2}$, where $E_y$ is defined as:

$$E_y = \sum_{n=0}^{N} |(s(n)_y)|^2,$$

where $s(n)_y$ is the sampled input signal of the yth frame, and N equals the number of samples in the yth frame defined by the time interval $t_a$ to $t_{a+2}$, which equals 160 when speech input signal 304 is sampled at 8 ksamples/sec.

Speech input signal 304 generally represents a speech signal word which may be corrupted by an acoustic noise signal. To decrease the amount of data used to represent the energy signature of each speech input signal 304, $E_y$ for each frame is normalized using the frame of speech input signal 304 having the maximum energy, $E_{max}$, i.e.

$$E_{y,norm} = \frac{E_y}{E_{max}}, y = 1, 2, \ldots, TO.$$

To further reduce the amount of data used to represent each speech input signal 304 energy signature while maintaining sufficient resolution to distinguish between different input signals, the logarithm of $E_{y,norm}$ is determined in LPC and energy parameters operation 316. Log $E_{y,norm}$ for each frame may be used during training and during recognition as a parameter in the quantization process.

In some environments, such as an automobile environment, noise signals are generally predictable or may be dynamically determined and occupy a low frequency spectral region. In the sampling window defined by the time interval $t_a$ to $t_{a+2}$, the rate of change of the noise signal from frame to frame is small when $t_{a+1}$ minus $t_a$ is relatively small. Additionally, overlapping of successive frames effectively decreases the frame time interval from $t_{a+2}-t_a$ to $t_{a+1}-t_a$ for purposes of determining frame-to-frame energy changes. Frame times may vary inversely to the noise signal frequency and processing performance. Thus, when speech input signal 304 is corrupted by a noise signal, taking the first derivative of each frame of speech input signal 304 in LPC and energy parameters operation 316 aids in suppressing the impact of any noise signal. The energy of the first derivative, $E'_y$, of each frame of the input signal is defined as, $$E'_y = (E_y)' = E_y - E_{y-1},$$

where $E_y$ is the original energy of the yth frame, y=1, 2, . . . , TO, and $E_{y-1}$ is the original energy of the preceding $(y-1)^{th}$ frame. For y=1, $E_{y-1}$ is zero. As with the original speech input signal 304, the first derivative energy data, $E'_y$, may be reduced for speech input signal 304 while maintaining sufficient resolution by utilizing the first derivative of $E_{y,norm}$ to generate normalized first derivative energy parameters, $E'_{y,norm}$. Furthermore, the data may be reduced in LPC and energy parameters operation 316 further for efficient processing by determining the logarithm of $E'_{y,norm}$, and also using log $E'_{y,norm}$ as a parameter in the quantization process to suppress the impact of low frequency noise, so that $E'_y = \log E_y$, norm $-\log E_{y-1}$, norm.

$$E'_y = \log E_y, \text{norm} - \log E_y, \text{norm}$$

Additionally, in LPC and energy parameters operation 316, the second derivative of the energy, $E''_y$, in each frame of speech input signal 304 is also determined and defined as, $$E''_y = (E'_y)' = E'_y - E'_{y-1},$$

where $E'_y$ is the first derivative of the original energy $E_y$ of the yth frame, y=1, 2, . . . , TO, and $E_{y-1}$ is the first derivative of energy of the preceding (y-1)th frame. For y=1, $E'_y$ is zero. As with the original speech input signal 304 and the first derivative energy data, the second derivative energy data, $E''_y$, y=1, 2, . . . , TO, may be reduced for speech input signal 304 while maintaining sufficient resolution by utilizing the first derivative of the normalized first derivative energy parameter, $E'_{y,norm}$ to generate normalized second derivative energy parameters, $E''_{y,norm}$. Furthermore, the data may again be reduced further by utilizing $E'_y$, which may be determined using log and/or normalized $E_y$ parameters.

The training process continues with LSP operation 318 generating, in a well-known manner, LSP frequencies (coefficients) from the respective LPC coefficients. LSP coefficients are, thus, generated for each speech input signal 304 frame for all q SNR levels from the LPC coefficients. The LSP representations of speech input signal 304 are used to define a spectral envelope, and they provide a robust representation of the speech short-term magnitude spectral envelope of speech input signal 304. Band limited input distortion affects only a subset of LSP coefficients, as compared to the case of a cepstral representation where input noise corrupts all the coefficients. Additionally, LSP parameters have both well-behaved dynamic range and filter stability preservation properties and can be coded more efficiently than other parameters. As a result, the LSP representation can lead to a 25–30% bit-rate reduction in coding the filter (vocal tract) information, as compared to the cepstral coefficient representation. Furthermore, spectral LSP sensitivities are localized, i.e., a change in a given LSP produces a change in the LP power spectrum only in its neighborhood frequencies. For example, a change in an LSP from 1285 Hz to 1310 Hz affects the LP power spectrum near 1400 Hz. This is particularly useful when speech is corrupted by narrow band noise in which case only a subset of LSP parameters are affected by the input noise.

In general given a short segment of speech input signal 304 and the corresponding all-pole filter $H(z)=G/A(z)$, where $A(z)$ is the inverse filter given by $$A(z)=1+a_1 z^{-1}+a_2 z^{-2}+\ldots+a_P z^{-D}$$

where D is the order of the predictor and $\{a_i\}$ are the prediction coefficients, the LSPs are defined by decomposing the inverse filter polynomial into two polynomials, $$P(z)=A(z)+z^{-(D+1)}A(z-1),$$

and $$Q(z)=A(z)-z^{-(D+1)}A(z-1),$$

where $P(z)$ is a symmetric polynomial, $Q(z)$ is an anti-symmetric polynomial and $$A(z)=\tfrac{1}{2}[P(z)+Q(z)].$$

The roots of the polynomials $P(z)$ and $Q(z)$ define the LSP coefficients.

The LSP coefficients generated in LSP and energy parameters operation 318 are mean compensated by LSP mean compensated parameters operation 319. LSP mean compensated parameters operation 319 mean compensates each $i^{th}$ order LSP coefficient for each of the TO frames of speech input signal 304 in accordance with Equation [0] which is reproduced below for convenience:

$$s_j(i)_{(m)} = s_j(i) - \frac{1}{TO}\sum_{j=1}^{TO} s_j(i), i=1,2,\ldots,D \text{ and}$$

$$j=1,2,\ldots,TO, [0]$$

where in the speech recognition systems 400 and 500, $s_j(i)_{(m)}$ represents the $i^{th}$ order mean compensated LSP coefficient for the $j^{th}$ frame of speech input signal 304, and the subtrahend of Equation 0 is the mean value of the $i^{th}$ LSP coefficient over all TO frames of speech input signal 304. The speech input signal 304 energy parameters are preferably not provided as input data to LSP mean compensated parameters operation 319 to prevent processing duplication by vector/matrix quantizer pairs 402 and 404.

The mean compensated LSP coefficients, $s_j(i)_{(m)}$, i=1, 2, . . . , D and j=1, 2, . . . , TO, are provided as input data to MQ 308m and VQ 306m. MQ 308m and VQ 306m develop codebook data from the mean compensated LSP coefficients from training words and quantize mean compensated LSP coefficients to provide output data during recognition in the same manner as MQ 308 and VQ 306, respectively, develop codebook data and provide quantized output data.

Continuing the training process, each of the uS matrix codebooks 310 contains a subset s, s=1, 2, . . . , S, of the parameters used to characterize speech input signal 304. In one embodiment of speech recognition system 400, S equals two and each of the $u_1$ matrix codebooks 310 contain the first through sixth order LSP parameters of each speech input signal 304 frame which are the primary LSP parameters affected by acoustic noise. The remaining $u_2$ matrix codebooks 310 contain the remaining orders of LSP parameters, for example, the seventh through twelfth order LSP parameters of each speech input signal 304 frame. In one embodiment, the matrices of uS matrix codebooks 310 are constructed such that each of the S submatrices contains consecutive rows of speech input signal 304 parametric data.

Likewise, each of the uS vector codebooks 312 contains a subset s, s=1, 2, . . . , S, of the parameters used to characterize a particular vocabulary word represented by speech input signal 304. In one embodiment of speech recognition system 400, S equals two and each of the $u_1$ vector codebooks 312 contains the first through sixth order LSP parameters of each speech input signal 304 frame which are the primary LSP parameters affected by acoustic noise. The remaining $u_2$ vector codebooks 312 contain the remaining orders of LSP parameters, for example, the seventh through twelfth order LSP parameters of each speech input signal 304 frame. In one embodiment, the vectors of uS vector codebooks 312 are constructed such that each of the S subvectors contains consecutive speech input signal 304 parametric data.

Each of the uS matrix codebooks 310 for a given vocabulary word is designed by developing a matrix entry from each of the qr input entries for a corresponding speech input signal 304 vocabulary word $W_{nhm}$, n=1, 2, . . . u, h=1, 2, . . . , q, m=1, 2, . . . , r, from the database of uqr words. The qr matrix entries for each of the u vocabulary words at each of the q SNR levels are processed to optimally cluster each of the qr entries for each of the uS matrix codebooks 310 into $C_s$ cells. Each of the uS vector codebooks 312 for a given vocabulary word is designed by developing a vector entry from each of the qr entries for a corresponding speech input signal 304 word $W_{nhm}$, n=1, 2, . . . , u, h=1, 2, . . . , q, m=1, 2, . . . , r, from the database of uqr words. The qr vector entries for each of the u words at each of the q SNR levels are processed to optimally cluster each of the qr entries for each of the uS vector codebooks 312 into $C_s$ cells. Note that, $C_s$ for MQ 308 may be different or identical to $C_s$ for VQ 306.

A centroid is computed for each of the $C_s$ cells for each of the uS matrix codebooks 310 and uS vector codebooks 312, respectively, for minimum quantization distortion using, for example, a Fuzzy C-algorithm or a fuzzy Linde-Buzo-Gray (LBG) algorithm as illustratively discussed in chapter 3 of the L. Cong thesis and further illustratively discussed in C. S. Xydeas and Lin Cong, "Robust Speech Recognition Using Fuzzy Matrix Quantisation, Neural Networks and Hidden Markov Models", pp. 1587–1590, EUSIPCO-96, Vol. 1, September, 1996, which is also incorporated by reference in its entirety. Note that $C_S$ for MQ 308 may be different or identical to $C_S$ for VQ 306.

To reduce demands on processing resources, each of the uS matrix codebooks 310 may be used to design a single matrix codebook 320 by combining the respective $C_S$ codewords, s=1, 2, . . . , S, of each respective vocabulary word of the uS matrix codebooks 310 into u times C (Cu) centroids of the single matrix codebook 320, where in one embodiment $C=(C_1+C_2+\ldots+C_S)$, where $C_S$ is the number of codewords in the $s^{th}$ matrix codebook and in a second embodiment, $C=C_1=C_2=\ldots=C_S$. The individual codewords are preferably unaltered after combining. For example, each codeword in the s=1 and n=1 codebook is concentrated with the corresponding codeword from the s=2 and n=1 codebook, and so on. 'Cu' may be chosen to accommodate available speech recognition system 400 resources and is, for example, equal to the training vocabulary word size times 32. Additionally, each of the uS vector codebooks 312 is used to design a single vector codebook 322 by combining the respective $C_s$, s=1, 2, . . . S, codewords of each of the uS vector codebooks 312 into u times C of the single vector codebook 322, where in one embodiment C=($C_1$+$C_2$+ . . . + $C_S$), where $C_s$ is the number of codewords in the sth vector codebook, and in a second embodiment, C=$C_1$=$C_2$= . . . =$C_S$, and $C_S$ may vary between all vector and matrix codebooks to reduce quantization. The individual centroids are preferably unaltered after combining. For example, each codeword in the s=1 and n=1 codebook is concentrated with the corresponding codeword from the s=2 and n=1 codebook, and so on. Cu may be chosen to accommodate available speech recognition system 400 resources and is, for example, also equal to the training vocabulary word size times 32. Additionally, "S" may be different or identical for uS matrix codebooks 310 and uS vector codebooks 312.

Matrix and vector codebook design is a general case, and, by setting s equal to one, the special case of nonsplit matrix and vector codebook design is accomplished. Speech recognition systems 300, 400, and 500 may use s codebooks, s=1, 2, . . . , or S. Additionally, a single codebook for all u words with C codewords may be designed in a well-known manner.

MQ 308 utilizes interframe information related to the "evolution" of the speech short-term spectral envelopes input signal energy parameters of speech input signal 304 by operating on N consecutive, overlapping speech frames of acoustic signal 304 (FIG. 4). VQ 306 is a special case of MQ 308 where N is set to one, and, thus, VQ 306 operates within the frequency domain and not the time domain. Each frame of speech input signal 304 is represented by D LSP parameters (LSP coefficients for quantizer pair 402 and LSP mean compensated coefficients for quantizer pair 404), and, thus, an N frames speech input signal 304 segment provides a P×N matrix of LSP parameters which may be split into S submatrices for MQ 308, and each frame of speech input signal 304 provides a P dimension vector which is split into S subvectors for VQ 306, where S is less than or equal to P. Each frame of speech input signal 304 is also represented by the three energy parameters, log $E_{y,norm}$, log $E'_{y,norm}$, and log $E''_{y,norm}$, and, thus, for quantizer pair 402, the N frame's input signal segment provides an additional 3×N matrix of energy parameters for MQ 308 and provides three additional dimensions to form a D+3 dimensions vector for VQ 306. Each matrix entry for MQ 308 and vector entry for VQ 306 for a speech input signal 304 word $W_{nhm}$ may be designed using a training set of TO input signal spectral parameter vectors and energy parameter vectors for quantizer pair 402, respectively derived from each of the TO frames of each acoustic signal 304 word $W_{nhm}$. Thus, a set X={$x_1$, $x_2$, . . . , $x_T$} of T (D+3)×N matrices for MQ 308, T D+3 dimension vectors for VQ 306, T D×N matrices for MQ 308$_m$, and T D×N vectors for VQ 306$_m$ for each acoustic signal 304 word $W_{nhm}$ results, where T=int(TO/N). $x_k$ has the general form of:

$$x_k = \begin{bmatrix} x^k_{11} & x^k_{12} & \cdots & x^k_{1N} \\ x^k_{21} & x^k_{22} & \cdots & x^k_{2N} \\ \cdots & \cdots & \cdots & \cdots \\ x^k_{P1} & x^k_{P2} & \cdots & x^k_{PN} \end{bmatrix} = \begin{bmatrix} \hat{x}_{1k}(m_1) \\ \hat{x}_{2k}(m_2) \\ \cdots \\ \hat{x}S_k(mS) \end{bmatrix}$$

where $\hat{x}_{sk}(m_s)$, k=1, 2, . . . , T, is formed by $m_s$ adjacent rows, s=1, 2, . . . , S and is the sth submatrix for MQ 308 and sth subvector with N equal to one for VQ 306. The first D entries of the $i^{th}$ column vector are the first through $D^{th}$ LSP spectral coefficients, respectively, and, for quantizer pair 402, the last three parameters (D+1 through D+3) are log $E_{y,norm}$, log $E'_{y,norm}$, and log $E''_{y,norm}$, respectively. Notice that $$\sum_{s=1}^{S} m_s = P$$

and $m_0$=0. Thus $$\hat{x}_{sk}(m_s) = \begin{bmatrix} x^k_{g+1,1} & x^k_{g+1,2} & \cdots & x^k_{g+1,N} \\ x^k_{g+2,1} & x^k_{g+2,2} & \cdots & x^k_{g+2,N} \\ \cdots & \cdots & \cdots & \cdots \\ x^k_{g+m_s,1} & x^k_{g+m_s,2} & \cdots & x^k_{g+m_s,N} \end{bmatrix} = [\bar{x}^k_{s1}, \bar{x}^k_{s2}, \cdots \bar{x}^k_{sN}]$$

where $g = \sum_{s=0}^{s-1} m_s$.

In one embodiment of speech recognition system 400, the total number of rows in $X_k$ is P. For quantizer pair 402, P equals D+3, where "3" is the number of energy parameters used in the characterization of each frame of speech input signal 304, and "D" represents, for example, twelve consecutive orders of LSP frequency coefficients. For quantizer pair 404, P equals D, and D represents, for example, twelve consecutive orders of mean compensated LSP frequency coefficients. S is, for example, selected to be two (2) to 'split' out the first six orders of LSP frequency coefficients where acoustic noise corruption is most prevalent from the fifteen total speech input signal 304 parameters. Thus, for $\hat{x}_{1k}(m_1)$, $m_1$ equals six and g=0. For $\hat{x}_{2k}(m_2)$, $m_2$ equals nine and g=6.

Each of the $\hat{x}_{sk}(m_s)$ entries includes j columns, j=1, 2, . . . , N. MQ 308 operates on time domain aspects of N frames of speech input signal 304, where N is greater than one and is, for example, two. VQ 306 is a special case of MQ 308 where j=N=1, and, thus, for VQ 306, $\hat{x}_{sk}(m_s)$ are vector entries. Thus, each of the uS matrix codebooks has rq times T $\hat{x}_{sk}(m_s)$ matrix entries, where the matrix entries for the $n^{th}$ vocabulary word are stored in the $n^{th}$ codebook, n=1, 2, . . . , u. Thus, in the embodiment where S=2, the u1 matrix codebooks contain the $\hat{x}_{1k}(m_1)$ matrix entries, and the u2 matrix codebooks contain the $\hat{x}_{2k}(m_2)$ matrix entries. The u1 vector codebooks contain the $\hat{x}_{1k}(m_1)$ vector entries, and the u2 vector codebooks contain the $\hat{x}_{2k}(m_2)$ vector entries.

Each set of T $\hat{x}_{sk}(m_s)$, s=1, 2, . . . , S, submatrices ("$X_{Ms}$") for MQ 308 and subvectors ("$X_{Vs}$") for the VQ 306, is processed, using, for example, the LBG algorithm, to yield respective $C_s$-cell $A_i^s$, i=1, 2, . . . , $C_s$ partitions of the s-submatrix space and, thus, produces a $C_s$ entries codebook containing $v_i^s$, i=1, 2, . . . , $C_s$, $m_s$×N centroids:

$$v_i^s = \begin{bmatrix} v^i_{g+1,1} & v^i_{g+1,2} & \cdots & v^i_{g+1,N} \\ v^i_{g+2,1} & v^i_{g+2,2} & \cdots & v^i_{g+2,N} \\ \cdots & \cdots & \cdots & \cdots \\ v^i_{g+m_s,1} & v^i_{g+m_s,2} & \cdots & v^i_{g+m_s,N} \end{bmatrix} = [\overline{v}^i_{s1}, \overline{v}^i_{s2}, \cdots, \overline{v}^i_{sN}]$$

where N is greater than one for uS matrix codebooks 310 and equals one for uS vector codebooks 312. The uS vector codebooks 312 and uS matrix codebooks 310 are processed using, for example, the LBG algorithm to obtain the minimum overall distortion between the training data base speech input signal 304 words and centroids using, for example, the distortion equations and distance measures described herein in conjunction with quantization and also as described in chapter 3 of the L. Cong thesis. In one embodiment, S is two to correspond to the split of input data parameters in one embodiment set forth above, and, thus, for $v_i^1$, $m_1$ equals six and g equals 0, and for $v_i^2$, $m_2$ equals nine and g equals six.

Each of the $C_s$ codeword entries, $v_i^s$, for each of the uS single codebooks 310 may be combined as described above to form the single codebook 320 having Cu codeword centroid matrices, $v_{Mi}$, i=1, 2, . . . , Cu, with C centroid codewords per vocabulary. Also, each of the $C_s$ codeword entries, $v_i^s$, for each of the uS vector codebooks 312 may be combined as described above to form the single codebook 322 having Cu codeword centroid vectors, $v_{Vi}$, i=1, 2, . . . , Cu, with C centroid codewords per vocabulary word. In one embodiment, S is two to correspond to the split of input data parameters in one embodiment set forth above, and, thus, for $v_i^1$, $m_1$ equals six and g equals 0, and for $v_i^2$, $m_2$ equals nine and g equals six.

During matrix and vector quantization, a distance measure is determined between predetermined codeword parameters and input signal parameters. The speech input signal 304 is quantized by associating the speech input signal 304 parameters to parameters of a single codeword in respective matrix and vector quantizers when making a 'hard' decision. When using a fuzzy decision process, the speech input signal 304 is quantized to parameters of multiple codewords in the VQ 306 and MQ 308, respectively, using a weighted degree of closeness. The type of parameters used to represent input signals and the codewords in respective single vector codebook 322 and single matrix codebook 320 and the distance measure algorithm employed generally play an important role in recognition (classification) accuracy, especially in acoustically noisy environments.

In different environments, speech is corrupted by acoustic noise of varying frequency. However, in some environments, the frequency bands occupied by noise signals can be generally predictable. For example, in an automotive environment, a large portion of acoustic noise energy is concentrated in the low frequency 400–400 Hz range which can particularly corrupt male voices. Additionally, car noise energy is generally predictable at different operating speeds. Thus, the peak of the noise spectra in an automotive environment is substantially located in generally predictable low frequencies. The noise spectrum then decreases exponentially as frequencies increase until after about 4 kHz the acoustic noise energy is very low. Through analyzing the effect of the automotive noise on LSP speech parameters, we found that the power of the car noise affects low order LSP parameters more than the high order LSP parameters.

A distance measure between the speech input signal 304 spectral frequencies and codeword spectral frequencies may be manipulated to further compensate for noise corruption. More specifically, noise compensation error factors may be computed using an error power spectrum of an input signal and a predicted input signal. The noise to be compensated for may be known, for example, from knowledge of a specific operating environment or may be dynamically determined. The error factors may be used to appropriately shift and weight each of the i$^{th}$ input signal and codeword spectral frequencies to compensate for noise corruption. Thus, when the energy parameters are combined with other signal parameters, such as line spectral pair coefficients, recognition accuracy may be enhanced. Exemplary distance measures and algorithms are described below and others are illustratively described in chapter 3 of the L. Cong thesis and in Asghar and Cong, "Robust Distance Measure". Furthermore, speech recognition system 400 may use any other distance measures and algorithms which are appropriate for the parameters used to characterize speech input signal 304.

For quantizer pair 404, the simple distance measure d(f,f̂) of Equation [1] is preferably utilized and is given by $$d(f, \hat{f}) = \sum_{i=1}^{P} [(f_1 - \hat{f}_1)] \quad [1]$$

where $f_i$ and $\hat{f}_i$ are the i$^{th}$ LSP in the speech input signal 304 and codeword, respectively, Continuing the training process of speech recognition system 400, each of the training database entries in the urq training word database are again provided as a respective training speech input signal 304 to speech recognition system 400. Each speech input signal 304 word $W_{nhm}$ is preprocessed by preprocess operation 312, and LPC coefficients and energy parameters log $E_{y,norm}$, log $E'_{y,norm}$, and log $E''_{y,norm}$ are derived in LPC and energy parameters operation 316 from each frame of speech input signal 304 as described above. Each of the LPC coefficients is converted into D respective LSP frequency coefficients by LSP and energy parameters operation 318. Each of the LSP frequency coefficients is mean compensated in LSP mean compensated parameters operation 319 in accordance with Equation [0]. When using respective single vector and matrix codebooks, each of the speech input signal 304 training words $W_{nhm}$ is again represented by a respective set of the TO speech spectral vectors for each frame of each speech input signal 304 word $W_{nhm}$, which result in the set X={$x_1, x_2, \ldots, x_T$} of T, where $$x_k = [\overline{x}_k(1), \overline{x}_k(2), \ldots, \overline{x}_k(N)]$$

with $$\overline{x}_k(j) = [x_{1j}^k, x_{2j}^k, \ldots x_{Pj}^k]^T$$

and the number of columns j in each of $x_k$ equals N, and N is greater than one for MQ 308 and equals one for VQ 306.

The respective fuzzy vector and matrix quantization of each of the training words $W_{nhm}$, using the single vector codebook 322 and single matrix codebook 320, respectively, are described by respective Cu×T fuzzy classification matrices $U_F$, with respective elements $u^F_{ik} \in [0,1]$, i=1, 2, . . . , Cu, k=1, 2, . . . , T. The value of $u^F_{ik}$, $0 \leq u^F_{ik} \leq 1$, indicates the degree of fuzziness of the k$^{th}$ input matrix $x_k$ to the i$^{th}$ partitioning cell which is represented by the centroid vectors $v_{Vi}$ and centroid matrices $v_{Mi}$, for VQ 306 and MQ 308, respectively.

The fuzzy classification matrix $U_F$ is defined generally as:

$$U_F = \begin{array}{c} \begin{array}{cccc} O_1 & O_2 & \cdots & O_T \end{array} \\ \begin{bmatrix} u^F_{111} & u^F_{121} & \cdots & u^F_{1TI} \\ u^F_{211} & u^F_{221} & \cdots & u^F_{2TI} \\ \cdots & \cdots & \cdots & \cdots \\ u^F_{Cu11} & u^F_{Cu21} & \cdots & u^F_{CuTI} \end{bmatrix} \end{array}$$
$$\vdots$$

Two conditions are also satisfied for both MQ 308 and VQ 306:

$$\sum_{i=1}^{Cu} u^F_{ik} = 1 \text{ and } \sum_{k=1}^{T} u^F_{ik} > 0$$

In this case, $u^F_{ik}$ is derived as:

$$u^F_{ik} = \frac{1}{\sum_{j=1}^{Cu} \left( \frac{d_{ik}(\hat{x}_k, v_i)}{d_{jk}(\hat{x}_k, v_j)} \right)^{\frac{1}{(F-1)}}}.$$

where the constant F influences the degree of fuzziness for F>1.

The respective columns $O_k$ of the classification matrices $U_{VF}$ and $U_{MF}$ "map" speech input signal 304 entries $x_k$ to $v_{Vi}$ for VQ 306 and $v_{Mi}$ for MQ 308, respectively, i=1, 2, ..., Cu. For both VQ 306 and MQ 308, the distance between columns $O_k=\{u_{1k}, u_{2k}, U_{Cu\,k}\}$ and the respective VQ 306 and MQ 308 centroid matrices V are defined generally as:

$$J(O_k, V) = \sum_{i=1}^{Cu} u^F_{ik} d(x_k, v_i),$$

where $v_i$ represents $v_{vi}$ and $v_{mi}$ for VQ 306 and MQ 308, respectively. Furthermore, the overall distortion of the Cu centroid entries of VQ 306 and MQ 308 when operating on each T×N sub-matrix set where N equals one for VQ 306, is:

$$J(U, V) = \sum_{k=1}^{T} \sum_{i=1}^{Cu} u^F_{ik} d(x_k, v_i).$$

Note that the summation of the components of the respective $O_k$ columns is equal to unity. The largest $u^F_{ik}$ component is the one which corresponds to the cell (centroid) with the smallest $d(x_k, v_i)$ distance measure. The $O_k$ columns can be interpreted as a probability mass matrix relating the T speech input signal 304 representative matrices $x_k$ for MQ 308 and T speech input signal 304 representative vectors for VQ 306 to all $v_i$, i=1, 2, ..., Cu, matrix and vector codewords, respectively. The total respective observation sequence $O_{MW}$ ($O_{MW(m)}$) of probability mass vectors for each speech input signal 304 word W for the single matrix codebook 320 (320$_{(m)}$) and the total respective observation sequence $O_{VW}$ ($O_{VW(m)}$) of probability mass vectors for each speech input signal 304 word W for single vector codebook 322 (322$_{(m)}$) are generally defined as $O_W=\{\{O_1, O_2, \ldots, O_T\}, O_k=\{u_{1k}^F, u_{2k}^F, \ldots, u_{Cu\,k}^F\}$, where n=1, 2, ..., u and k=1, 2, ..., T.

Distance measurements may be determined as described above.

The general distortion equation is:

$$J(W, V) = \sum_{k=1}^{T} \sum_{i=1}^{Cu} w_{ik} d(x_k, v_i), k = 1, 2, \ldots, T$$

with $$w_{ik} = \begin{cases} u_{ik} & u_{ik} \in \{0, 1\}, \text{ (hard decision process)} \\ u^F_{ik} & u_{ik} \in [0, 1], \text{ (fuzzy decision process)}. \end{cases}$$

Furthermore, the overall distortion for all of the codeword entries in the VQ 306 and MQ 308 while operating on the complete X matrix set is $$J(U, V) = \sum_{k=1}^{T} \sum_{i=1}^{Cu} u^F_{ik} d(x_k, v_i).$$

Split vector and split matrix design and quantization are illustratively described in chapter 3 of the L. Cong thesis. Hard decision vector and matrix quantization be used to quantize speech input signal 304 and is illustratively discussed in chapter 3 of the L. Cong thesis.

During the training mode of speech recognition system 400, the training input data for the hidden Markov models of classifier HMM $\lambda_{Vn}$ (HMM $\lambda_{Vn(m)}$), n=1, 2, ..., u, are in one embodiment the observation sequences $O_{VW}$ ($O_{VW(m)}$) of probability mass vectors $O_{Vk}$ from classification matrix $U_V$. The classification matrix $U_V$ is generated by VQ 306 from a fuzzy or hard, and split or nonsplit vector quantized speech input signal 304 for each of the training words $W_{nhm}$ as described above. Each of the respective u vocabulary words for each repetition r and SNR levels q is, in one embodiment, fuzzy vector quantized to train a corresponding HMM $\lambda_{Vn}$ (HMM $\lambda_{Vn(m)}$) process. In one embodiment, each of the observation sequences $O_{VW}$ ($O_{VW(m)}$) from VQ 306 (VQ 306$_m$) for each of the urq training words train corresponding HMM $\lambda_{Vn}$ (HMM $\lambda_{Vn(m)}$) processes, i.e. for an $n^{th}$ vocabulary word, an input observation sequence $O_{VW}$ ($O_{VW(m)}$) trains only the $n^{th}$ HMM $\lambda_{Vn}$ (HMM $\lambda_{Vn(m)}$). Separate gender specific HMM $\lambda_{Vn}$'s (HMM $\lambda_{Vn(m)}$'s) may be built for males and females by using the rq versions of each word by male speakers for male HMMs and female speakers for female HMMs, as described below with reference to FIG. 7, and the number of states of each HMM $\lambda_{Vn}$ (HMM $\lambda_{Vn(m)}$) is set to, for example, five. The state transition probability and probability distribution parameters, which correspond to specific observations, are optimized in a well-known manner for each HMM $\lambda_{Vn}$ (HMM $\lambda_{Vn(m)}$). HMM $\lambda_{Vn}$ (HMM $\lambda_{Vn(m)}$) training is further described in chapters 2 and 4 of the L. Cong thesis.

Likewise, during the training mode of speech recognition system 400, the training input data for the hidden Markov models of classifier HMM $\lambda_{Mn}$ (HMM $\lambda_{Mn(m)}$), n=1, 2, ..., u, are in one embodiment the observation sequences $O_{MW}$ ($O_{MW(m)}$) of probability mass vectors $O_{Mk}$ from classification matrices $U_M$. The classification matrix $U_M$ is generated by MQ 308 from a fuzzy or hard, and split or nonsplit matrix quantized speech input signal 304 for each of the training words $W_{nhm}$ as described above. Each of the respective u vocabulary words for each repetition r and SNR levels q is, in one embodiment, fuzzy matrix quantized to train a corresponding HMM $\lambda_{Mn}$ (HMM $\lambda_{Mn(m)}$) process. In one embodiment, each of the observation sequences $O_{MW}$ from MQ 308 for each of the urq training words train corresponding HMM $\lambda_{Mn}$ (HMM $\lambda_{Mn(m)}$) processes, i.e. for an $n^{th}$ vocabulary word, an input observation sequence $O_{MW}$ ($O_{MW(m)}$) trains only the $n^{th}$ HMM $\lambda_{Mn}$ (HMM $\lambda_{Mn(m)}$). Separate gender specific HMM $\lambda_{Mn}$ (HMM $\lambda_{Mn(m)}$'s) may be built for males and females by using the rq versions of each word by male speakers for male HMMs and female speakers for female HMMs, and the number of states of each HMM $\lambda_{Mn}$ (HMM $\lambda_{Mn(m)}$) is set to, for example, five. The state transition probability and probability distribution parameters, which correspond to specific observations, are optimized in a well-known manner for each HMM $\lambda_{Mn}$ (HMM $\lambda_{Mn(m)}$) HMM $\lambda_{Mn}$ (HMM $\lambda_{Mn(m)}$) training is further described in chapters 2 and 4 of the L. Cong thesis.

Each HMM has a given number of states Y that are defined by three parameters $\{A,B,\pi\}$ where Y is, for example, five. The parameter A represents a state transition matrix $[a_{96\ o}]$ where $a_{\tau\sigma}$ represents the state transition probability between the $\tau^{th}$ and the $\sigma^{th}$ states, $1 \leq \tau \leq Y$ and $1 \leq \sigma \leq Y$. The parameter B represents the stochastic matrix where $[b_\sigma(i)]$ is the probability of observing the current probability mass vector, $O_k$, given the current state $\sigma$. The parameter $\pi$ represents an initial state distribution probability matrix $[\pi_\tau]$ where $\pi_1$ equals one and $\pi_{\tau+1}$ equals zero, $\tau=1, 2, \ldots, Y-1$.

Thus, because the $n^{th}$ HMM $\lambda_{Mn}$ and HMM $\lambda_{Mn(m)}$ model the same vocabulary word $W_n$, are trained using the same input signal data, and receive observation sequence data from the same type of quantizer (MQ), the initial state distribution probability, $\pi$, is common between HMM $\lambda_{Mn}$ and HMM $\lambda_{Mn(m)}$. However, the input data to MQ 308 and MQ 308$_M$ does vary with respect to the actual characterization of speech input signal 304. Thus, the stochastic matrix parameter B may vary sufficiently between the $n^{th}$ HMM $\lambda_{Mn}$ and HMM $\lambda_{Mn(m)}$. Developing the $\pi$, A, and B parameters is well known to those of ordinary skill in the art and is disclosed in, for example, chapter 2 of the L. Cong thesis.

In one embodiment, HMM $\lambda_{Mn}$ and HMM $\lambda_{Mn(m)}$ are trained separately, and the corresponding $\pi$ and A parameters are subsequently consolidated by, for example, discarding the $\pi$ and A parameters from HMM $\lambda_{Mn}$ or vice versa and retaining the respective B parameters. In another embodiment, the $n^{th}$ HMM $\lambda_{Mn}$ and HMM $\lambda_{Mn(m)}$ share common $\pi$ and A parameters developed from quantization input data, $O_{MW}$, from MQ 308 or quantization input data, $O_{MW(m)}$, from MQ 308$m$, and respective B parameters are developed for both HMM $\lambda_{Mn}$ and HMM $\lambda_{Mn(m)}$ from $O_{MW}$ and $O_{MW(m)}$, respectively.

Likewise, because the $n^{th}$ HMM $\lambda_{Vn}$ and HMM $\lambda_{Vn(m)}$ model the same vocabulary word $W_n$, are trained using the same input signal data, and receive observation sequence data from the same type of quantizer (VQ), the initial state distribution probability, $\pi$, is common between HMM $\lambda_{Vn}$ and HMM $\lambda_{Vn(m)}$. However, the input data to VQ 306 and VQ 306$_M$ does vary with respect to the actual characterization of speech input signal 304. Thus, the stochastic matrix parameter B may vary sufficiently between the $n^{th}$ HMM $\lambda_{Vn}$ and HMM $\lambda_{Vn(m)}$. Developing the $\pi$, A, and B parameters is well known to those of ordinary skill in the art and is disclosed in, for example, chapter 2 of the L. Cong thesis.

In one embodiment, HMM $\lambda_{Vn}$ and HMM $\lambda_{Vn(m)}$ are trained separately, and the corresponding $\pi$ and A parameters are subsequently consolidated by, for example, discarding the $\pi$ and A parameters from HMM $\lambda_{Vn}$ or vice versa and retaining the respective B parameters. In another embodiment, the $n^{th}$ HMM $\lambda_{Vn}$ and HMM $\lambda_{Vn(m)}$ share common $\pi$ and A parameters developed from quantization input data, $O_{VW}$, from VQ 306 or quantization input data, $O_{VW(m)}$, from VQ 306$m$, and respective B parameters are developed for both HMM $\lambda_{Vn}$ and HMM $\lambda_{Vn(m)}$ from $O_{VW}$ and $O_{VW(m)}$, respectively.

Referring to FIG. 5, with path 2 selected, the NN 330 is trained by repeating the rq versions of the u signal 304 training words into speech recognition system 500, respectively quantizing the speech input signal 304 training words with VQ 306 and MQ 308, and, in one embodiment, the probabilities $Pr(O_{VW}|\lambda_{Vn})$, $Pr(O_{VW(m)}|\lambda_{Vn(m)})$, $Pr(O_{MW}|\lambda_{Mn})$, and $Pr(O_{MW}|\lambda_{Mn(m)})$, n=1, 2, ..., u, are all determined using the Viterbi algorithm and provided as input data to mixer 502 during training and recognition. Corresponding probabilities based on input data from the matrix quantizers may be compared, and the highest probability from each such respective comparison is combined with the corresponding highest probabilities generated from the vector quantizers. The combination may be weighted, for example, as generally set forth by Equation [11]. For example, $Pr(O_{MW}, \lambda_{M1})$ is combared with $Pr(O_{MW}, \lambda_{M1(m)})$, $Pr(O_{VW}, \lambda_{V1})$ is compared with $Pr(O_{VW}, \lambda_{V1(m)})$, and max $\{Pr(O_{MW}, \lambda_{M1}), Pr(O_{MW}, \lambda_{M1(m)})\}$ is combined with max $\{Pr(O_{VW}, \lambda_{V1}), Pr(O_{VW}, \lambda_{V1(m)})\}$.

In another embodiment, the memory needed to store HMM parameters and the processing resources required to determine such maximum likelihood probabilities may be relatively reduced by capitalizing on the commonality of input data to each of the respective HMM $\lambda_{Mn}$ and HMM $\lambda_{Mn(m)}$, n=1, 2, ..., u. The probabilities $Pr(O_{VW}, O_{VW(m)}|\lambda_{Vn}, \lambda_{Vn(m)})$ and $Pr(O_{MW}, O_{MW(m)}|\lambda_{Mn}, \lambda_{Mn(m)})$, n=1, 2, ..., u, are generated using a maximum likelihood algorithm such as Viterbi algorithm 326 for each of the u HMM $\lambda_{Mn}$ and u HMM $\lambda_{Mn(m)}$ and Viterbi algorithm 324 for each of the u HMM $\lambda_{Vn}$ and HMM $\lambda_{Vn(m)}$.

The probability $Pr(O_{VW}, O_{VW(m)}|\lambda_{Vn}, \lambda_{Vn(m)})$ is the consolidated probability that HMM $\lambda_{Vn}$ and HMM $\lambda_{Vn(m)}$ generated the respective observation sequences $O_{VW}$ and $O_{VW(m)}$ based on consolidated HMM $\lambda_{Vn}$ and HMM $\lambda_{Vn(m)}$ parameters, respectively. When the A and $\pi$ parameters for the $n^{th}$ HMM $\lambda_{Vn}$ and HMM $\lambda_{Vn(m)}$ are stored in common, the parameters for U HMM $\lambda_{Vn}$ and u HMM $\lambda_{Vn(m)}$ may be collectively defined as $\{A, B_V, B_{V(m)}, \pi\}$. In one embodiment, the Viterbi algorithm 326 also capitalizes on parameter consolidation and efficiently determines $Pr(O_{VW}, O_{VW(m)}|\lambda_{Vn}, \lambda_{Vn(m)})$ as follows:

$$\delta_1^n(1) = \log[\pi_1^n b_1^n(O_1)] = \log[b_1^n(O_1)], n=1, 2, \ldots, u \qquad [3]$$

$$\delta_1^n(\tau) = 0, \tau=2, 3, \ldots, Y \qquad [4]$$

$$\delta_k^n(\sigma) = {}_{1 \leq \tau \leq Y}^{max}\{\delta_{k-1}^n(\tau) + \log[a_{\tau\sigma}^n b_{\sigma V}^n(O_k) b_{\sigma V(m)}^n(O_k)]\} \text{ (recursion)} \qquad [5]$$

$$Pr(O_{VW}, O_{VW(m)}|\lambda_{Vn}, \lambda_{Vn(m)})_n = {}_{1 \leq \sigma \leq Y}^{max} \delta_T^n(\sigma) \qquad [6]$$

where k=2, 3, ..., T, $\sigma$=1, 2, ..., Y, and n=1, 2, ..., u.

Likewise, the probability $Pr(O_{MW}, O_{MW(m)}|\lambda_{Mn}, \lambda_{Mn(m)})$ is the consolidated probability that HMM $\lambda_{Mn}$ and HMM $\lambda_{Mn(m)}$ generated the respective observation sequences $O_{MW}$ and $O_{MW(m)}$ based on consolidated HMM $\lambda_{Mn}$ and HMM $\lambda_{Mn(m)}$ parameters, respectively. When the A and $\pi$ parameters for the $n^{th}$ HMM $\lambda_{Mn}$ and HMM $\lambda_{Mn(m)}$ are stored in common, the parameters for U HMM $\lambda_{Mn}$ and u HMM $\lambda_{Mn(m)}$ may be collectively defined as $\{A, B_M, B_{M(m)}, \pi\}$. In one embodiment, the Viterbi algorithm 324 also capitalizes on parameter consolidation and efficiently determines $Pr(O_{MW}, O_{MW(m)}|\lambda_{Mn}, \lambda_{Mn(m)})$ as follows:

$$\delta_1^n(1) = \log[\pi_1^n b_1^n(O_1)] = \log[b_1^n(O_1)], n=1, 2, \ldots, u \qquad [7]$$

$$\delta_1^n(\tau) = 0, \tau=2, 3, \ldots, Y \qquad [8]$$

$$\delta_k^n(\sigma) = {}_{1 \leq \tau \leq \gamma}{}^{max} \{\delta_{k-1}^n(\tau) + \log[a_{\tau\sigma}{}^n b_{\sigma M}{}^n(O_k) b_{\sigma Mm}{}^n(O_k)]\} \text{ (recursion)} \quad [9]$$

$$Pr(O_{MW}, O_{MW(m)}|\lambda_{Mn}, \lambda_{Mn(m)})_n = {}_{1 \leq \sigma \leq \gamma}{}^{max} \delta_T^n(\sigma) \quad [10]$$

where k=2, 3, ..., T, σ=1, 2, ..., Y, and n=1, 2, ..., u.

When speech recognition system 500 operates in a training mode, the $n^{th}$ probability $Pr(O_{VW}|\lambda_{Vn})'$ from Viterbi algorithm 324 is combined by the mixer 502 with the $n^{th}$ probability $Pr(O_{MW}|\lambda_{Mn})'$ from Viterbi algorithm 326 for n=1, 2, ..., u to generate MQ error compensated classification data, D(n), for each of the u vocabulary words of speech recognition system 400, where $Pr(O_{VW}|\lambda_{Vn})'$ represents $Pr(O_{VW}, O_{VW(m)}|\lambda_{Vn}, \lambda_{Vn(m)})$ and the combination of $Pr(O_{VW}|\lambda_{Vn})$ and $Pr(O_{VW(m)}|\lambda_{Vn(m)})$ discussed above and $Pr(O_{MW}|\lambda_{Mn})'$ represents $Pr(O_{MW}, O_{MW(m)}|\lambda_{Mn}, \lambda_{Mn(m)})$ and the combination of $Pr(O_{MW}|\lambda_{Mn})$ and $Pr(O_{MW(m)}|\lambda_{Mn(m)})$ discussed above. D(n) is defined in one embodiment as:

$$D(n) = \alpha Pr(O_{MW}|\lambda_{Mn})' + Pr(O_{VW}|\lambda_{Vn})', \, n=1, 2, \ldots, u. \quad [11]$$

The scaling constant 'α' may be adjusted to maximize recognition accuracy and is, for example, set to two.

Mixer 502 selectively provides output data to NN 504. In one embodiment, mixer 502 provides all 2u probabilities $Pr(O_{VW}|\lambda_{Vn})'$ and $Pr(O_{MW}|\lambda_{Mn})'$ and u compensated classification output data D(n) for n=1, 2, ..., u as input data to NN 504. NN 504 is trained to accurately identify the $n^{th}$ speech input signal 304 training word as the $n^{th}$ vocabulary word. Note that other direct distance measure data from VQ 306 and MQ 308 may also be used in selective combination with previous input data as illustratively described in U.S. patent application Ser. No. 08/883,978 by Lin Cong and Safdar M. Asghar and entitled "Adaptive Speech Recognition With Selective Input Data To A Speech Classifier", which is incorporated by reference in its entirety.

In one embodiment neural network 504 is a multilayer perceptron type NN. Multilayer networks overcome many of the limitations of single-layer networks. That is, multilayered, hierarchical networks are more powerful because of the nonlinearities and the internal representation generated in the so-called hidden layers. The multiple nodes in the output layer typically correspond to multiple classes in the multi-class pattern recognition problem. In general, an MLP neural network 330 has an ability to partition an input pattern space in a classification problem and to represent relationships between events. Additionally, MLP neural network 330 with multiple layers and sufficient interconnections between nodes ensures an ability to "learn" complex classification boundaries, and implement nonlinear transformations for functional approximation problems. The MLP neural network 330 has G hidden nodes where G is preferably determined empirically based upon the number of u vocabulary words, memory size, and processing capabilities.

Referring to FIGS. 4 and 5, after training the speech recognition system 400, path 2 is selected to engage the recognition process. When any speech input signal 304 word $W_n$ is spoken by a user, VAD 314 effectively defines end points of input words for IWSR. Speech input signal 304 word $W_n$ is next preprocessed by preprocess operation 312 as described above. Word $W_n$ is sampled at, for example, 8 ksamples/sec, and segmented into TO frames of t seconds each, such as t equal to 20 msec with a 10 msec overlap of each consecutive frame of $W_n$. LPC and energy parameters operation 316 generates D LPC coefficients and the log $E_{y,norm}$, log $E'_{y,norm}$, and log $E''_{y,norm}$ energy coefficients for each frame of the $W_n$. LSP operation 332 generates Dth order LSP coefficients from the LPC coefficients as described above, and LSP mean compensated parameters operation 319 mean compensated each LSP coefficient generated by LSP operation 332, as described above.

Thus, each frame of speech input signal 304 is again represented by D order LSP coefficients and the three energy parameters, log $E_{y,norm}$, log $E'_{y,norm}$, and log $E''_{y,norm}$. Each frame of speech input signal 304 is also again represented by D order LSP mean compensated coefficients.

VQ 306 vector quantizes the vector representation $X_{Vn}$, of word W with the designed Cu codeword entries of the single vector codebook 322. Single vector codebook 322 yields the observation sequence $O_{VW}$ and single vector codebook 322$_m$ yields the observation sequence $O_{VW(m)}$ as described above for the particular speech input signal 304 word $W_n$. Observation sequences $O_{VW}$ and $O_{VW(m)}$ are used as input data by Viterbi algorithm 324 operating on each of the HMM $\lambda_{Vn}$ and HMM $\lambda_{Vn(m)}$ processes, n=1, 2, ... u, as discussed above. Viterbi algorithm operation 324 utilizes the respective observation sequences $O_{VW}$ and $O_{VW(m)}$ to produce respective maximum likelihood probabilities $Pr(O_{VW}|\lambda_{Vn})'$, n=1, 2, ..., u from each pair of HMM $\lambda_{Vn}$ and HMM $\lambda_{Vn(m)}$ processes as described above. The u probability data outputs of the Viterbi algorithm 324 are the respective maximum likelihood probability measures $Pr(O_{VW}|\lambda_{Vn})'$, n=1, 2, ..., u. Note that $0 \leq Pr(O_{VW}|\lambda_{Vn})' \leq 1$, and the Viterbi algorithm 324 produces a logarithmic probability.

Likewise, MQ 308 matrix quantizes the matrix representation $X_{Mn}$, of word W with the designed Cu codeword entries of the single matrix codebook 320. Single matrix codebook 320 yields the observation sequence $O_{MW}$ and single matrix codebook 320$_m$ yields the observation sequence $O_{MW(m)}$ as described above for the particular speech input signal 304 word $W_n$. Observation sequences $O_{MW}$ and $O_{MW(m)}$ are used as input data by Viterbi algorithm 326 operating on each of the HMM $\lambda_{Mn}$ and HMM $\lambda_{Mn(m)}$ processes, n=1, 2, ..., u. Viterbi algorithm operation 326 utilizes the respective observation sequences $O_{MW}$ and $O_{MW(m)}$ to produce respective maximum likelihood probabilities $Pr(O_{MW}|\lambda_{Mn})'$, n=1, 2, ..., u from each pair of HMM $\lambda_{Mn}$ and HMM $\lambda_{Mn(m)}$ processes as described above. The u probability data outputs of the Viterbi algorithm 326 are the respective maximum likelihood probability measures $Pr(O_{MW}|\lambda_{Mn})'$, n=1, 2, ..., u. Note that $0 \leq Pr(O_{MW}|\lambda_{Mn})' \leq 1$, and the Viterbi algorithm 324 produces a logarithmic probability.

Referring to FIG. 4, when speech recognition system 400 is in recognition mode, the $n^{th}$ probability $Pr(O_{VW}|\lambda_{Mn})'$ from HMM $\lambda_{Vn}$ and HMM $\lambda_{Vn(m)}$ is combined by decision logic 328 with the $n^{th}$ probability $Pr(O_{MW}|\lambda_{Nn})'$ from HMM $\lambda_{Mn}$ and HMM $\lambda_{Mn(m)}$ for n=1, 2, ..., u to generate MQ error compensated classification data D(n), for each of the u vocabulary words of speech recognition system 400, where D(n) is defined in one embodiment in Equation [11].

The scaling constant 'α' may be adjusted to maximize recognition accuracy and is, for example, set to two. Computing resources may be more favorably disposed to computing the logarithm of each D(n) for n=1, 2, ..., u and obtaining respective absolute values. It will be recognized that either or both $Pr(O_{VW}|\lambda_{Vn})'$ and $Pr(O_{MW}|\lambda_{Mn})'$ may be scaled.

Decision logic 328 then classifies the speech input signal 304 as the $n^{th}$ vocabulary word if D(n)=max {D(1), D(2), ..., D(u)}.

Figure 7:
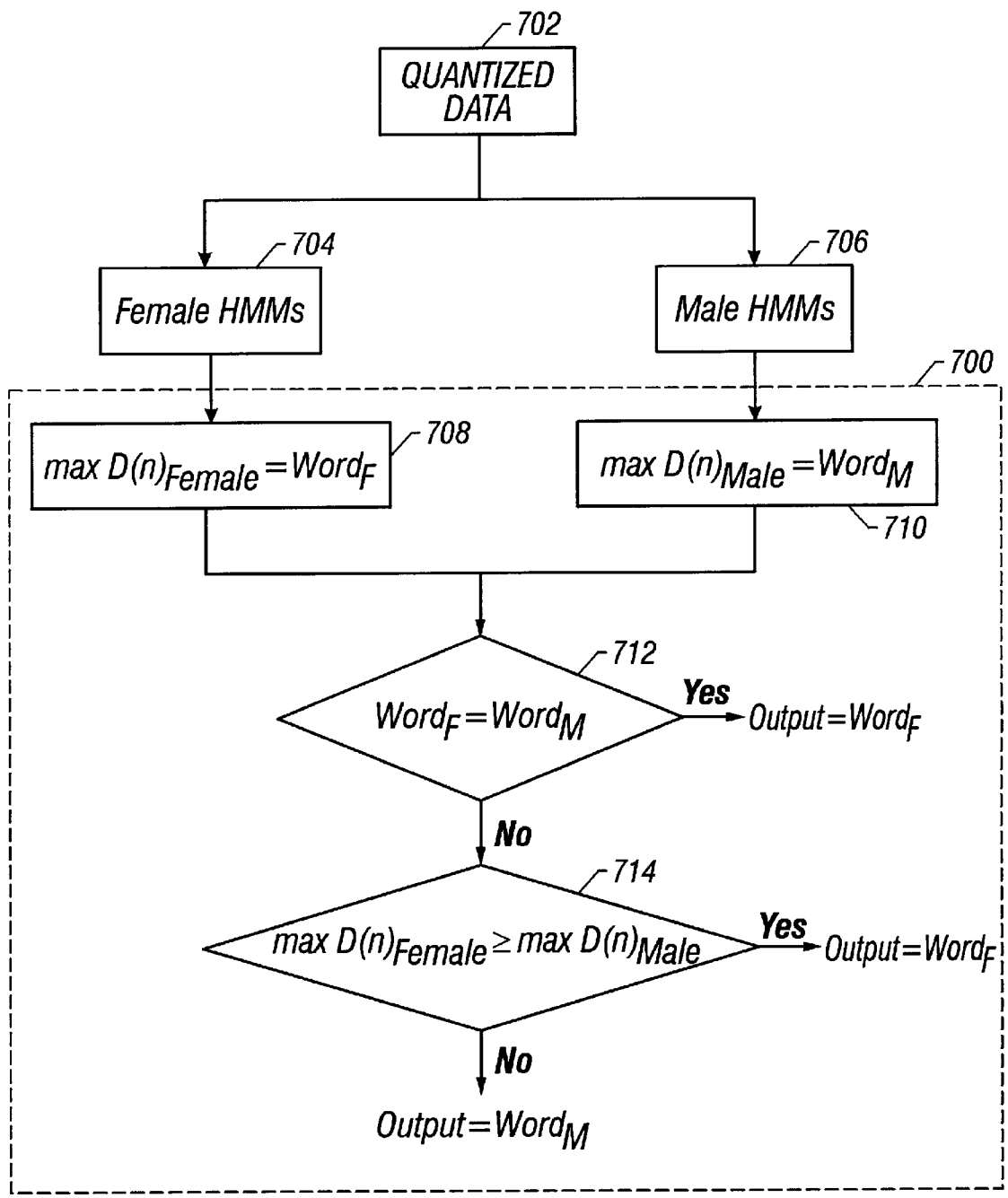
FIG. 7 illustrates a gender specific hidden Markov model deterministic process.

Referring to FIGS. 4 and 7, when speech recognition system 400 may utilize gender specific hidden Markov models to increase recognition accuracy. In such an event, parallel sets of hidden Markov models are trained and utilized, one set is trained from a male speaker source and the other set from a female speaker source. When decision logic 328 is engaged in recognition mode, decision logic 328 engages the gender specific HMM deterministic process 700. The gender specific HMM deterministic process 700 determines whether a source of speech input signal 304 is more likely male or female or is indeterminate.

As described above, quantized data 702 from each quantizer in speech recognition system 400. The gender specific HMM deterministic process 700 receives quantized data from the quantizers of speech recognition system 400, and female HMMs 704 and male HMMs 706 are trained as generically discussed above with reference to HMM $\lambda$'s in speech recognition system 400. Speech input signal 304, which during recognition represents $Word_n$, is processed by the Viterbi algorithms 324 and 326, as generically discussed above to develop respective male compensated classification data, $D(n)_{Male}$, and female compensated classification data, $D(n)_{Female}$. It will be understood by persons of ordinary skill in the art that if only matrix quantization is used, $D(n)_{Male}$ and $D(n)_{Female}$ will only represent $Pr(O_{MW}|\lambda_{Mn})'$, and, if only vector quantization is used, $D(n)_{Male}$ and $D(n)_{Female}$ will only represent $Pr(O_{VW}|\lambda_{Vn})'$. In female word classification operation 708, $Word_n$ is initially classified as the $n^{th}$ vocabulary word of speech recognition system 400 if max $D(n)_{Female}$=max$\{D(1), D(2), \ldots, D(u)\}_{Female}$. In male word classification operation 710, $Word_n$ is initially classified as the $n^{th}$ vocabulary word of speech recognition system 400 if max $D(n)_{Male}$=max$\{D(1), D(2), \ldots, D(u)\}_{Male}$. The output data of female word classification operation 708 is designated as $Word_F$, and the output data of male word classification operation 710 is designated as $Word_M$.

Next, gender word classification comparison operation 712 determines if $Word_F$ is the same as $Word_M$. If so, decision logic 328 classifies speech input signal 304 as $Word_F$, and, if not, gender probability comparision operation 714 determines if max $D(n)_{Female} \geq$ max $D(n)_{Male}$. If max $D(n)_{Female} \geq$ max $D(n)_{Male}$, decision logic 328 classifies speech input signal 304 as $Word_F$, if max $D(n)_{Female}<$max $D(n)_{Male}$, decision logic 328 classifies speech input signal 304 as $Word_M$. In another embodiment, the default for gender probability comparison operation 714 is $Word_M$.

Referring to FIG. 5, when speech recognition system 500 operates in a recognition mode, the $n^{th}$ probability $Pr(O_{VW}|\lambda_{Vn})'$ from HMM $\lambda_{Vn}$ and HMM $\lambda_{Vn(m)}$ is combined by the mixer 502 with the $n^{th}$ probability $Pr(O_{MW}|\lambda_{Mn})'$ from HMM $\lambda_{Mn}$ and HMM $\lambda_{Mn(m)}$ for n=1, 2, . . . , u to generate MQ error compensated classification data, D(n), for each of the u vocabulary words of speech recognition system 400, where D(n) is again defined, in one embodiment, in Equation [11].

The scaling constant '$\alpha$' may be adjusted to maximize recognition accuracy and is, for example, set to two. Computing resources may be more favorably disposed to computing the logarithm of each D(n) for n=1, 2, . . . , u and obtaining respective absolute values. It will be recognized that either or both $Pr(O_{VW}|\lambda_{Mn})'$ and $Pr(O_{MW}|\lambda_{Mn})'$ may be so scaled.

Mixer 502 selectively provides output data to NN 504. In one embodiment, mixer 502 provides D(n) output data and the separate u respective Viterbi algorithm probability output data from VQ 306 and MQ 308 as 3u respective input data to NN 504. Mixer 502 selectivity may be based on the computing resources available with respect to accuracy degradation factors present, such as detected noise levels. The NN 504 provides u output data OUT(n), n=1, 2, . . . , u to decision logic 506. The NN 506 output data have respective values between 0 and 1 which represent the likelihood that the speech input signal 304 word corresponds to the $n^{th}$ word with 1 being a higher probability. Decision logic 506 then classifies the speech input signal 304 word $W_n$ as the $n^{th}$ vocabulary word if OUT(n)=max$\{$OUT(1), OUT(2), . . . , OUT(u)$\}$. In one embodiment, when using gender specific HMMs, mixer 502 and NN 504 are duplicated and gender based probabilities are applied to separate mixers and neural networks. Decision logic 506 then classifies the speech input signal 304 word $W_n$ as the $n^{th}$ vocabulary word if OUT (2n)=max $\{$OUT(1)$_{MALE}$, OUT(2)$_{MALE}$, . . . , OUT (u)$_{MALE}$, OUT(1)$_{FEMALE}$, OUT(2)$_{FEMALE}$, . . . , OUT(u)$_{FEMALE}\}$.

The speech recognition systems 300, 400, and 500 may be implemented in an electronic system as instructions and data stored in a memory and utilized by a processor or processors coupled to the memory.

Thus, a speech recognition system may be trained using a variety of training input signals that may vary not only in vocabulary, but also in other areas such as signal to noise ratio and gender. Each such input signal may then be characterized by frequency parameters and mean compensated frequency parameters such as LSP spectral parameters and mean compensated LSP spectral parameters. Each characteristic parameter and mean compensated parameter may then be used to develop input data for respective vector quantizer and matrix quantizer pairs. Centroids are subsequently developed and organized in multiple codebooks, for example, one per vocabulary word per quantizer, and may be further organized into single codebooks, one for each quantizer, by combining the respective multiple codebooks groups for each respective quantizer.

Each training input signal may then be quantized independently by the vector and matrix quantizer pairs using, for example, either hard or fuzzy logic. Various distance measures may be employed to reduce quantization errors and thus enhance recognition accuracy. Split quantization may be used to focus different processing, such as varying distance measure algorithms, on different characteristic parameters.

Stochastic models, such as HMMs, may be employed as post classifiers. Each HMM may model a different vocabulary word and may also be gender specific. The quantized characteristic parameters for an input signal word from each quantizer serve as the observation sequence to be modeled by the respective HMM. HMM modeling or training may capitalize on frequency parameters and mean compensated frequency parameters being related to a common input signal by, for example, consolidating initial state and state transition probabilities.

In one embodiment, training input signal data is again used to train a neural network. Output probabilities, computed by, for example, the Viterbi algorithm, are generated by each using the respective HMM characteristic data from the quantization data observation sequences. The probabilities from the HMM characteristic data from the vector and matrix quantizer pairs are combined in accordance with a predetermined algorithm and used as input data to train the neural network. The Viterbi algorithm probabilities may also be provided to the neural network.

The recognition process follows the neural network training process except that the output data of the trained neural network is examined to select the most likely vocabulary word resulting from the input signal word. Thus, the input signal word is recognized with a high probability of accuracy.

While the invention has been described with respect to the embodiments and variations set forth above, these embodiments and variations are illustrative and the invention is not to be considered limited in scope to these embodiments and variations. For example, it will be recognized that continuous time data and continuous time algorithms may be used in substitution of the discrete time data and discrete time algorithms, respectively. Additionally, other input signal parameter types may be used to characterize speech input signal 304, and other distance measures may be used. Using continuous time methods will generally increase processing requirements. Also, split HMMs may use respective split matrix observation sequences from VQ 306 and respective split matrix observation sequences from MQ 308 during training and speech recognition. Furthermore, output distance measure data from VQ 306 and MQ 308 may be selectively combined with output data from mixer 330 to form input data for NN 330 as illustratively described in U.S. patent application Ser. No. 08/883,978 by Lin Cong and Safdar M. Asghar and entitled "Adaptive Speech Recognition With Selective Input Data To A Speech Classifier", which is incorporated by reference in its entirety to provide speech recognition. Also, the overall respective distance measures from VQ 306 and MQ 308 may be combined, with or without weighting, to provide speech recognition. Additionally, speech input signal 304 may be more generally any speech or nonspeech acoustic input signal with preprocessing being modified to accommodate, for example, any known bandwidth information. Moreover, speech input signal 304 may be a general input signal with likewise processing modifications. Accordingly, various other embodiments and modifications and improvements not described herein may be within the spirit and scope of the present invention, as defined by the following claims.

What is claimed is:

1. An apparatus comprising:

a mean compensation module to receive parameters for TO samples of an input signal and to generate mean compensated parameters from the received input signal parameters;

a first quantizer to receive the input signal parameters and to quantize the input signal parameters, wherein the first quantizer is comprised of a first matrix quantizer and a first vector quantizer;

a second quantizer to receive the input signal mean compensated parameters and to quantize the input signal mean compensated parameters wherein the second quantizer is comprised of a second matrix quantizer and a second vector quantizer;

a backend processor to receive the quantized input signal parameters and the input signal mean compensated input signal parameters and to classify the input signal therefrom, wherein the backend processor comprises:

a first group of hidden Markov models which are trained using quantized input signal parameters from the first and second matrix quantizers;

a second group of hidden Markov models which are trained using quantized input signal parameters from the first and second vector quantizers; and a stochastic module to (a) receive the quantized input signal parameters from the first and second matrix quantizers, (b) determine the respective probabilities that each hidden Markov model from the first group of hidden Markov models modeled the quantized input signal parameters from the first and second matrix quantizers, (c) receive the quantized input signal parameters from the first and second vector quantizers, (d) determine the respective probabilities that each hidden Markov model from the second group of hidden Markov models to have modeled the quantized input signal parameters from the first and second vector quantizers, wherein the backend processor is capable of utilizing the probabilities to generate the input signal classification.

2. The apparatus as in claim 1 wherein the backend processor further comprises:

decision logic to receive the respective probabilities and to combine the respective probabilities to classify the input signal therefrom.

3. The apparatus as in claim 1 wherein the backend processor further comprises:

a mixer to combine the respective probabilities;

a neural network to receive the combined respective probabilities and to determine respective likelihood data which relate the input data to a vocabulary word of the apparatus; and decision logic to receive the likelihood data and to classify the input signal therefrom.

4. The apparatus as in claim 1 wherein the input signal parameters are frequency parameters.

5. The apparatus as in claim 1 wherein the vector quantizer in the first quantizer is capable of generating vector quantized data and the matrix quantizer in the first quantizer is capable of generating matrix quantized data, wherein the vector quantized data is capable of being combined with the matrix quantized data to generate the quantized input signal frequency parameters.

6. The apparatus as in claim 1 wherein the vector quantizer in the second quantizer is capable of generating mean compensated vector quantized data and the matrix quantizer in the second quantizer is capable of generating mean compensated matrix quantized data, wherein the mean compensated vector quantized data is capable of being combined with the mean compensated matrix quantized data to generate the quantized input signal mean compensated frequency parameters.

7. The apparatus as in claim 1 wherein the stochastic module further comprises a Viterbi algorithm.

* * * * *